(12) United States Patent
Sugimoto et al.

(10) Patent No.: US 8,312,234 B2
(45) Date of Patent: Nov. 13, 2012

(54) STORAGE SYSTEM CONFIGURED FROM PLURALITY OF STORAGE MODULES AND METHOD FOR SWITCHING COUPLING CONFIGURATION OF STORAGE MODULES

(75) Inventors: Sadahiro Sugimoto, Kawasaki (JP); Noboru Morishita, Yokohama (JP); Kazuyoshi Serizawa, Tama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 12/738,601

(22) PCT Filed: Apr. 5, 2010

(86) PCT No.: PCT/JP2010/002468
§ 371 (c)(1),
(2), (4) Date: Apr. 16, 2011

(87) PCT Pub. No.: WO2011/125106
PCT Pub. Date: Oct. 13, 2011

(65) Prior Publication Data
US 2012/0023290 A1  Jan. 26, 2012

(51) Int. Cl.
*G06F 12/00* (2006.01)
(52) U.S. Cl. ........................................ 711/161; 709/217
(58) Field of Classification Search .................. 711/161; 709/217
See application file for complete search history.

(56) References Cited

U.S. PATENT DOCUMENTS

| | | | |
|---|---|---|---|
| 6,173,377 B1 * | 1/2001 | Yanai et al. | 711/162 |
| 2003/0158999 A1 * | 8/2003 | Hauck et al. | 711/113 |
| 2005/0283569 A1 | 12/2005 | Mizuno et al. | |
| 2006/0277382 A1 * | 12/2006 | Matsui et al. | 711/165 |
| 2007/0124407 A1 | 5/2007 | Weber et al. | |
| 2008/0229010 A1 | 9/2008 | Maeda et al. | |
| 2008/0250210 A1 | 10/2008 | Ash et al. | |
| 2009/0150608 A1 * | 6/2009 | Innan et al. | 711/113 |
| 2009/0198942 A1 | 8/2009 | Morishita et al. | |
| 2009/0248953 A1 | 10/2009 | Satoyama et al. | |

FOREIGN PATENT DOCUMENTS

| | | |
|---|---|---|
| EP | 1681625 A2 | 7/2006 |
| EP | 1720101 A1 | 11/2006 |
| JP | 2009-181402 A | 8/2009 |
| JP | 2009-245387 A | 10/2009 |

* cited by examiner

*Primary Examiner* — Jared Rutz
(74) *Attorney, Agent, or Firm* — Volpe and Koenig, P.C.

(57) ABSTRACT

There are a loose coupling and a tight coupling as the coupling configurations for a first module and a second module. The loose coupling is a coupling configuration in which the first and second modules are coupled together by way of a front-end path, and the first module is not able to access a second storage resource. The tight coupling is a coupling configuration in which the first and second modules are coupled together by way of a back-end path, and the first module is able to access the second storage resource. A switch from the loose coupling to the tight coupling is performed using the following processing flow without the first and second modules being partitioned into respectively independent storage modules. Specifically, first, the first and second modules are coupled together by way of the back-end path, and next, the first module merges information denoted by second management information from the second storage resource with first management information via the back-end path.

12 Claims, 18 Drawing Sheets

| MODULE # | NO. OF LDEVs | LDEV # CORRECTION VALUE |
|---|---|---|
| 0 | 48 | 0 |
| 1 | 30 | 48 |

311A

LDEV# CORRECTION INFORMATION

Fig. 6

STORAGE SYSTEM CONFIGURED FROM PLURALITY OF STORAGE MODULES AND METHOD FOR SWITCHING COUPLING CONFIGURATION OF STORAGE MODULES

TECHNICAL FIELD

This invention relates to a storage system configured from a plurality of storage modules.

BACKGROUND ART

A storage system that is configured from a plurality of storage modules is known (for example, Patent Literature 1). In the Patent Literature 1, a method for changing the configuration of the storage system is disclosed. More specifically, in the Patent Literature 1, a method for coupling partitioned storage modules and a method for partitioning coupled storage modules are disclosed.
[Citation List]
[Patent Literature]
[PTL 1]
Japanese Patent Application Laid-Open No. 2009-245387

SUMMARY OF INVENTION

Technical Problem

According to the Patent Literature 1, the maintenance staff must input path-related information to define the path to the volume when changing the configuration of the storage system.

Furthermore, according to the Patent Literature 1, it is possible to support a use case in which mutually independent storage modules are used individually, and a use case in which a set of a plurality of storage modules is used as a single storage system. From the standpoint of scalability, it is desirable to be able to support a new use case other than these use cases.

Accordingly, an object of the present invention is to provide a storage system whose configuration is capable of being changed without the maintenance staff inputting path-related information.

Another object of the present invention is to provide a storage system that is able to deal with a new use case.

Solution to Problem

A first storage module comprises a first storage resource that stores first management information, and a second storage module comprises a second storage resource that stores second management information.

There are a loose coupling and a tight coupling as the coupling configurations for the first and second storage modules.

The loose coupling is a coupling configuration in which first and second front-end interfaces of the first and second storage modules are coupled together by way of a front-end path, and the first storage module is not able to access the second storage resource.

Alternatively, the tight coupling is a coupling configuration in which the first and second back-end interfaces of the first and second storage modules are coupled together by way of a back-end path, and the first storage module is able to access the second storage resource.

The coupling configuration of the first and second storage modules may be switched from the loose coupling to the tight coupling using the following processing flow without the first and second storage modules being partitioned into respectively independent storage modules. That is, first, the first and second back-end interfaces are coupled together by way of the back-end path, and next, the first storage module merges information denoted by the second management information from the second storage resource with the first management information via the back-end path.

BRIEF DESCRIPTION OF DRAWINGS

FIG. 6 shows LDEV # correction information 311A.

DESCRIPTION OF EMBODIMENTS

An example of the present invention will be explained below.

Further, an ID (identifier), a number and the like will be used as information for identifying one or another target in the following explanation, but the present invention is not limited to this information and other types of identification information may also be used.

In the following explanation, there may be instances when "program" is used as the subject in explaining a process, but since a prescribed process is carried out by executing a program in accordance with a processor (for example, a CPU (Central Processing Unit)) while using a storage resource (for example, a memory) and/or communication interface device (for example, a communication port) as needed, the subject of the explanation may also be the processor. Also, a process that is explained having the program as the subject may be a process that is performed by a storage controller. The present invention may comprise a hardware circuit for processing either all or a portion of the processes carried out by the processor. Further, a computer program may be installed in the respective computers from a program source. The program source, for example, may be a program delivery server or a storage media.

Further, in the following explanation, it is supposed that there are two storage modules (hereinafter, modules) to make it easier to understand the explanation. That is, it is supposed that one module is coupled to one module. However, the present invention is also applicable to a storage system in which one or more modules is coupled to a plurality of modules.

<Configuration of Computer System Comprising Storage System Related to an Example of the Present Invention>

Figure 1:
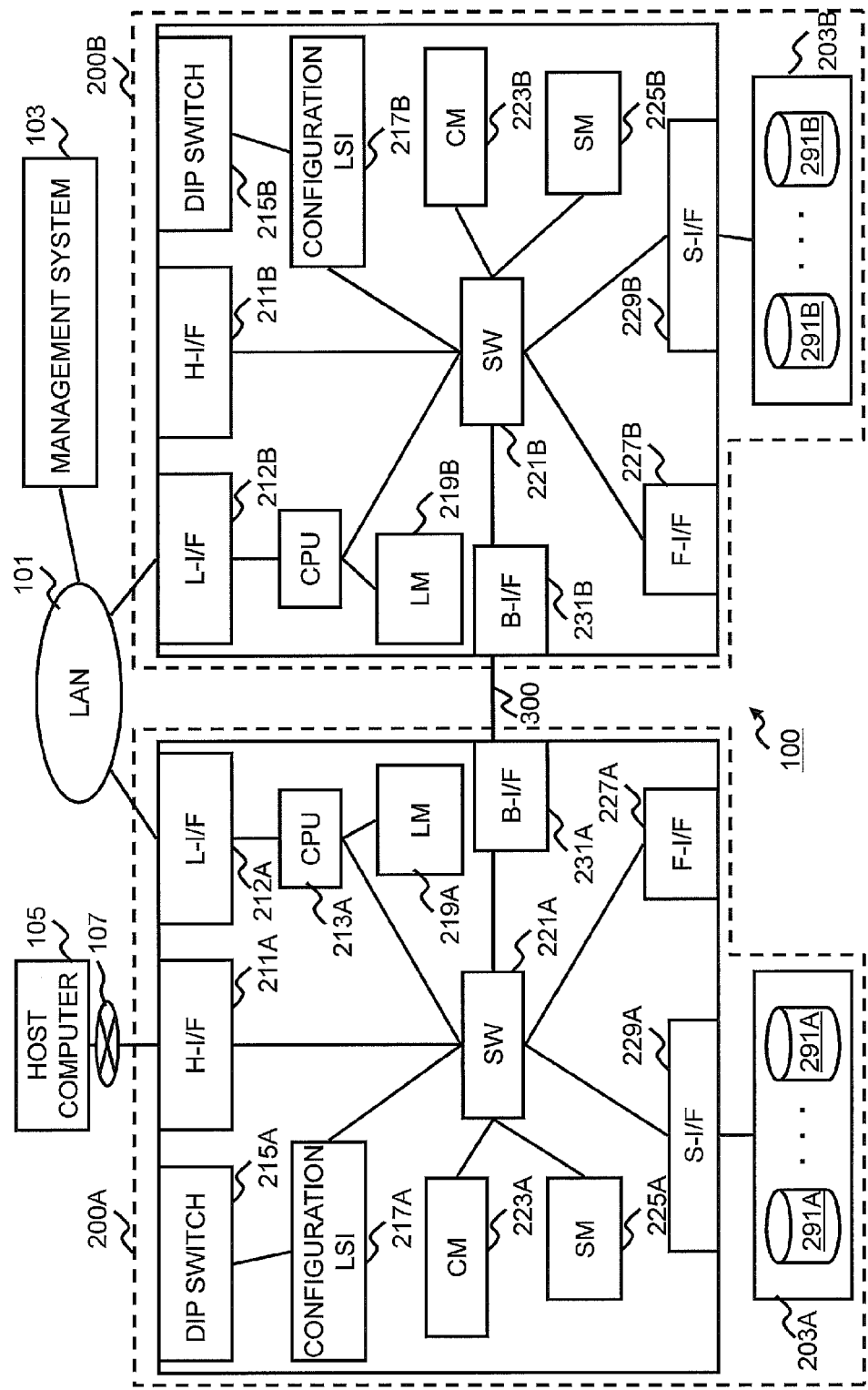
FIG. 1 shows the configuration of a computer system comprising a storage system (a loosely-coupled storage system) related to an example of the present invention.

FIG. 1 shows the configuration of a computer system that comprises a storage system related to an example of the present invention. The same parent numbers are attached to the same types of elements in FIG. 1 (and FIG. 2). Specifically, the element reference sign of the module 200A is a number that combines the child sign "A" with the parent number. The element reference sign of the module 200B is a number that combines the child sign "B" with the parent number. In the following explanation, in a case where the explanation does not distinguish between elements of the same type, only the parent number (for example, 200) will be used, and in a case where the explanation distinguishes between elements of the same type, a combination of the parent number and a child sign (for example, 200A, 200B) will be used.

A management system 103 and a storage system 100 are coupled to a LAN (Local Area Network) 101. A different type of communication network may be used instead of the LAN 101.

The management system 103 is for managing the storage system 100. The management system 103 may be configured from one or more computers. Specifically, for example, in a case where a management computer displays information, or in a case where the management computer sends display information to a remote computer, the management computer is the management system. Further, for example, in a case where functions identical to those of the management computer are realized by a plurality of computers, this plurality of computers (may comprise a display computer when the display computer performs the display) is the management system.

The management system 103, for example, comprises a communication interface device (I/F) that is coupled to the LAN 101, a storage resource (for example, a memory), a display device, and a CPU (Central Processing Unit), which is coupled to these elements. The CPU sends a management information merge request to the storage system 100 in response to a coupling configuration switch instruction from the maintenance staff. The CPU also displays information received from the storage system 100 via the I/F on the display device. The "coupling configuration switch instruction" is an instruction for switching the coupling configuration of the storage system 100. The "management information merge request" is a request to merge the management information. The "management information" is information, which is stored in the SM 225A (225B) and is used to control I/O to a physical storage device group 203A (203B).

The storage system 100 is configured from modules 200A and 200B. A host computer 105 is coupled to module 200A via a communication network (for example, a SAN (Storage Area Network) 107. The host computer 105 sends an I/O (Input/Output) request to the storage system 100. The host computer 105 may also be coupled to module 200B in addition to module 200A. A different type of host apparatus (for example, a different storage system) may be coupled to the storage system 100 either instead of or in addition to the host computer 105.

The module 200 comprises a physical storage device group 203, and a controller 201. In the example shown in the drawing, the configuration of controller 201A and the configuration of controller 201B are identical, but these configurations do not always have to be the same.

The physical storage device group 203 is a plurality of physical storage devices 291. An arbitrary type of physical storage device may be used. The physical storage device 291, for example, is a HDD (Hard Disk Drive), a SSD (Solid State Device) or a flash memory device. One or more RAID (Redundant Array of Independent (or Inexpensive) Disks) groups is configured by the physical storage device group 203. A storage space of the one or more RAID groups is treated as a plurality of virtual storage devices (hereinafter, VDEV). In this example, the storage space of one RAID group is either one or a plurality of VDEVs. Either one or a plurality of logical storage devices (hereinafter, LDEV) are formed on the basis of the VDEV.

Controller 201A will be given as a typical example in explaining the controllers 201A and 201B.

The controller 201A comprises a host interface (H-I/F) 211A, a LAN interface (L-I/F) 212A, a local memory (LM) 219A, a CPU 213A, a dip switch 215A, a configuration LSI (Large Scale Integration) 217A, a cache memory (CM) 223A, a shared memory (SM) 225A, a storage interface (S-I/F) 229A, a front-end interface (F-I/F) 227A, a back-end interface (B-I/F) 231A, and a switch (SW) 221A. There may be a plurality of at least one of these elements. For example, there may be a plurality of CPUs 213A, and one of these may be the designated CPU 213A. The designated CPU 213A may carry out the management information merge process, which will be described hereinbelow.

The H-I/F 211A is a communication interface device that is coupled to the host computer 105.

The L-I/F 212A is a communication interface device that is coupled to the LAN 101.

The LM 219A stores information that is used by the CPU 213A, and a computer program that is executed by the CPU 213A. The LM 219A is coupled to the CPU 213A, and is not coupled to the SW 221.

The CPU 213A executes a computer program that is stored in the local memory 219A. The computer program may be stored in the SM 225A or another storage resource instead of the LM 219A.

The dip switch 215A is a switch for setting a number allocated to the module 200A comprising this switch 215A (hereinafter, the module #) to this module 200A. Another type of input device (for example, a touch panel display device) may be used instead of the dip switch 215A to set the module #.

The configuration LSI 217A is an LSI that comprises a register for storing a module # that has been set.

The CM 223A temporarily stores data that is input and output to the physical storage device 291.

The SM 225A stores the management information, which is information that is used to control the storage system 100.

The S-I/F 229A is a communication interface device that is coupled to one or more physical storage devices 291.

The F-I/F 227A is a communication interface device that is coupled to the F-I/F 227B of the module 200B.

The B-I/F 231A is a communication interface device that is coupled to the B-I/F 231B of the module 200B.

The elements 211A, 213A, 231A, 227A, 229A, 225A, 223A, and 217A are coupled to the SW 221A. The SW 221A switches the couplings of these elements. The interface between the SW 221 and the respective elements, for example, is PCI-Express (PCIe).

<Tight Coupling and Loose Coupling>

Tight coupling and loose coupling are the coupling configurations for the modules 200A and 200B. Tight coupling and loose coupling will be explained in this example.

Tight coupling is a coupling configuration in which the one of the modules 200A and 200B is able to use the hardware resources of the other of the modules 200A and 200E as though they were its own hardware resources. Specifically, for example, tight coupling is the coupling configuration that enables the CPU 213A (213B) to access the SM 225B (225A). To realize tight coupling, the B-I/Fs 231A and 231B are coupled together by way of the back-end path (for example, the transmission line in accordance with PCIe) 300 as shown in FIG. 1. The interface between the B-I/Fs 231A and 231B is the same interface as that between the CPU 213A and the SW 221A, between the SW 221A and the SM 225B, between the SW 221A and the B-I/F 231A, between the B-I/F 231B and the SW 221B, between the SW 221B and the CPU 213B, and between the SW 221B and the SM 225B (for example, PCIe). Therefore, the CPU 213A (213B) is able to access the SM 225B (225A) via the B-I/Fs 231A and 231B the same as it accesses SM 225B (225A). Furthermore, in the tight coupling, the hardware resource inside the module 200B (200A) that the CPU 213A (213B) is able to use is not limited to the SM 225E (225A), but rather also includes other types of hardware resources (for example, either the CM 223B (223A) or the H-I/F 211B (211A)). In the tight coupling, the maximum distance between the modules 200A and 200B is shorter than the maximum distance between the modules 200A and 200B in the loose coupling.

Figure 2:
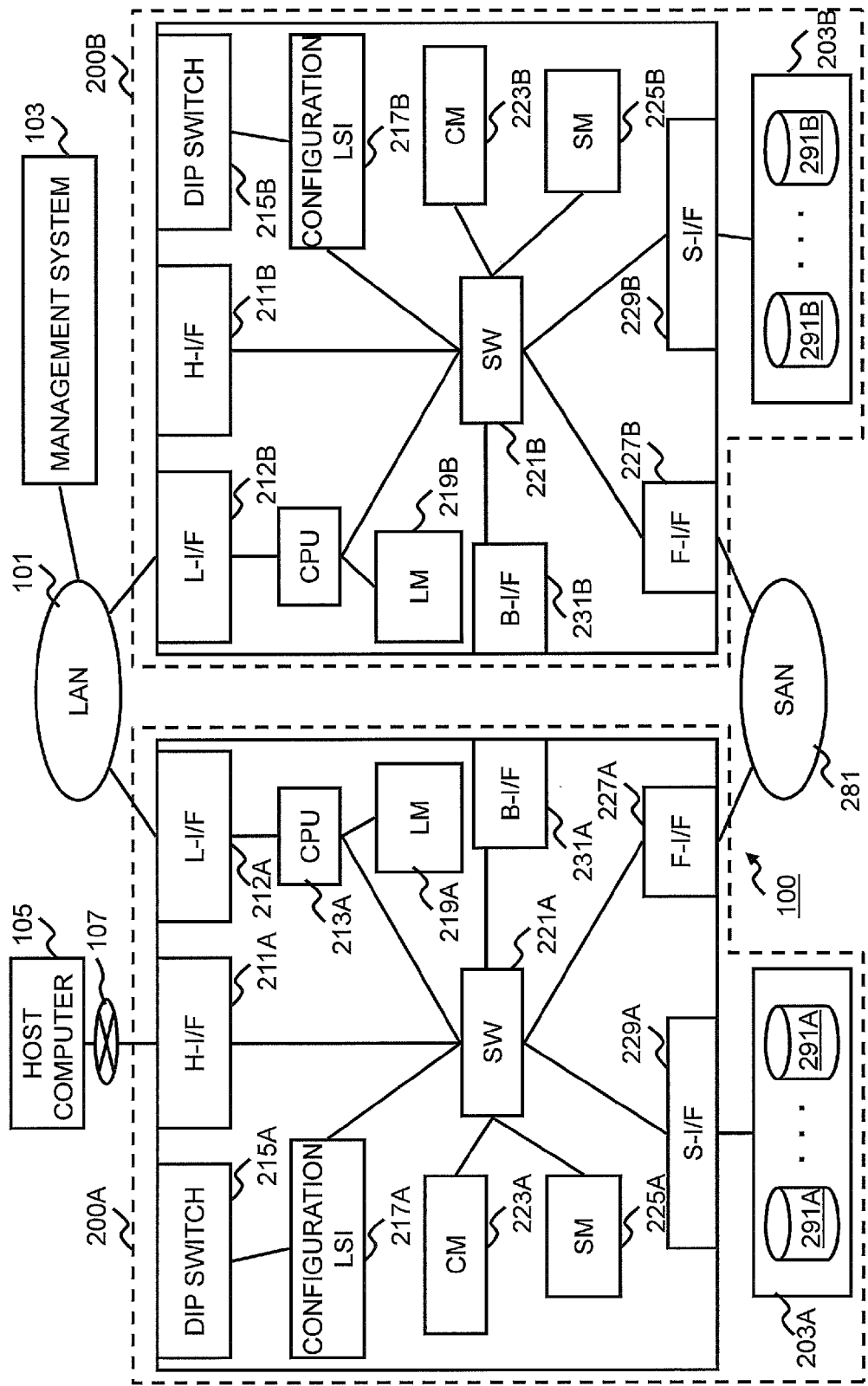
FIG. 2 shows the configuration of a computer system comprising a storage system (a tightly-coupled storage system) related to an example of the present invention.

The loose coupling is a coupling configuration in which the one of the modules 200A and 200B is not able to use the hardware resources of the other of the modules 200A and 200B as though they were its own hardware resources. Specifically, for example, loose coupling is the coupling configuration in which the CPU 213A (213B) is not able to access the SM 225B (225A). To realize loose coupling, the F-I/Fs 227A and 227B are coupled instead of the B-I/Fs 231A and 231B as shown in FIG. 2. According to the example of FIG. 2, the F-I/Fs 227A and 227B are coupled together by way of the SAN (Storage Area Network) 281, but may also be coupled via another type of front-end interface (for example, a dedicated line). The interface between the F-I/Fs 227A and 227B, for example, is a FC (Fibre Channel), and is different from the interface (for example, the PCIe) between the CPU 213A and the SW 221A, between the SW 221A and the SM 225B, between the SW 221A and the B-I/F 231A, between the B-I/F 231B and the SW 221B, between the SW 221B and the CPU 213B, and between the SW 2213 and the SM 225B. Therefore, the CPU 213A (213B) is not able to access the SM 225B (225A).

The advantages of the tight coupling, for example, are that it is possible to control the management information (the information inside the SM 225B) of the module 200B from the module 200A, and that I/O processing overhead is low (there is no need to transfer an I/O command from the module 200A to the module 200B).

Alternatively, the advantages of the loose coupling are that the modules 200A and 200B can be farther apart than in the tight coupling, and a module can be dynamically added during operation (in a state in which the storage system 100 is able to receive an I/O command from the host computer 105). For example, the maintenance staff can physically couple N (where N is an integer of equal to or larger than 3) modules in a coupling configuration that conforms to the loose coupling, operate m (where N>m) modules, and as needed, add a module to be operated to the storage system 100 by using the management system 103 to ramp up at least one of the (N-m) modules.

For example, a new use case like that below can be considered in accordance with the respective advantages of tight coupling and loose coupling, and the scalability (for example, scalability that makes it possible to reduce the initial investment and expand the size of the storage system through reasonable investments tailored to the size of the business) desired in the storage system. That is, a use case in which online augmentation (the maintenance staff uses the management system 103 to add a module) that conforms to the loose coupling is carried out in accordance with a sudden increase in the load, and thereafter, the coupling configuration is switched to the tight coupling during regular maintenance to improve performance effectiveness.

In this example, it is possible to switch from a loose coupling to a tight coupling without partitioning the modules once (without creating a state in which the respective modules are independent). That is, a configuration change corresponding to a new use case like that described above is possible.

<Computer Programs and Information Stored in Local Memory>

Figure 3:
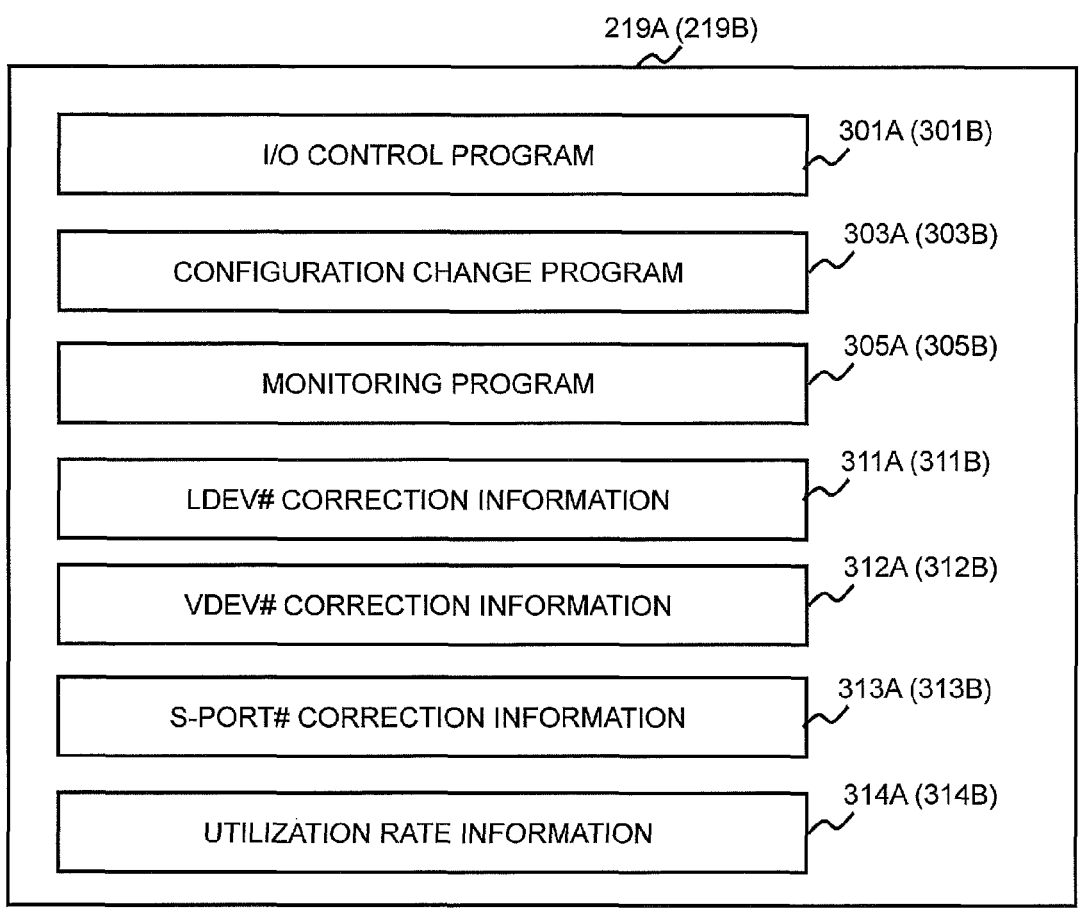
FIG. 3 shows the computer programs and information stored in LM 219A (219B).

FIG. 3 shows the computer programs and information stored in the LM 219A (219B).

The LM 219A (219B) stores an I/O control program 301A (301B), a configuration change program 303A (303B), a monitoring program 305A (305B), LDEV # correction information 311A (311B), VDEV # correction information 312A (312B), S port # correction information 313A (313B) and utilization rate information 314A (314B).

The I/O control program 203A (203B) process an I/O command received from the host computer. For example, the I/O control program 301A (301B) access the physical storage device group 301A (301B) based on management information stored in the SM 225A (225B).

The configuration change program 303A (303B) carries out a management information merge process for switching from the loose coupling to the tight coupling, and a management information partition process for switching from the tight coupling to the loose coupling. The configuration change program 303A (303B) is executed in a case where the module 200A (200B) is the master.

The monitoring program 305A (305B) monitors the communication utilization rate by way of the F-I/F 227A (227B), and updates a value denoted by utilization rate information 314A (314B) to a value that denotes the detected utilization rate. The monitoring program 305A (305B) is also executed in a case where the module 200A (200B) is the master. "Utilization rate" as used here is the percentage of the current data transmission speed with respect to the maximum bandwidth, and is an example of an index that denotes the communication load via the F-I/F 227A (227B).

The LDEV # correction information 311A (311B) is used for correcting the LDEV # (the LDEV number). The VDEV # correction information 312A (312B) is used for correcting the VDEV # (the VDEV number). The port # correction information 313A (313B) is used for correcting the S port # (the storage port number). The utilization rate information 314A (314B) denotes the value of the utilization rate of communications by way of the F-I/F 227A (227B). The information 311A through 313A (311B through 313B) is temporarily created by the configuration change program 303A (303B) during the management information merge process in a case where the module 200A (200B) is the master. The utilization rate information 314A (314B) is created and updated by the monitoring program 305A (305B) executed when the module 200A (200B) is the master.

At least one of the programs 301A (301B), 303A (303B), and 305A (305B), and the information 311A through 314A (311B through 314B) shown in FIG. 3 may be stored in another storage resource (for example, the SM 225A (225B)) instead of the LM 219A (219B).

Hereinbelow, a storage system for which the coupling configuration of the modules 200A and 200B is the loose coupling will be called a "loosely-coupled storage system", and a storage system for which the coupling configuration of the modules 200A and 200B is the tight coupling will be called a "tightly-coupled storage system".

<Hierarchy of the Module 200A (200B)>

Figure 4:
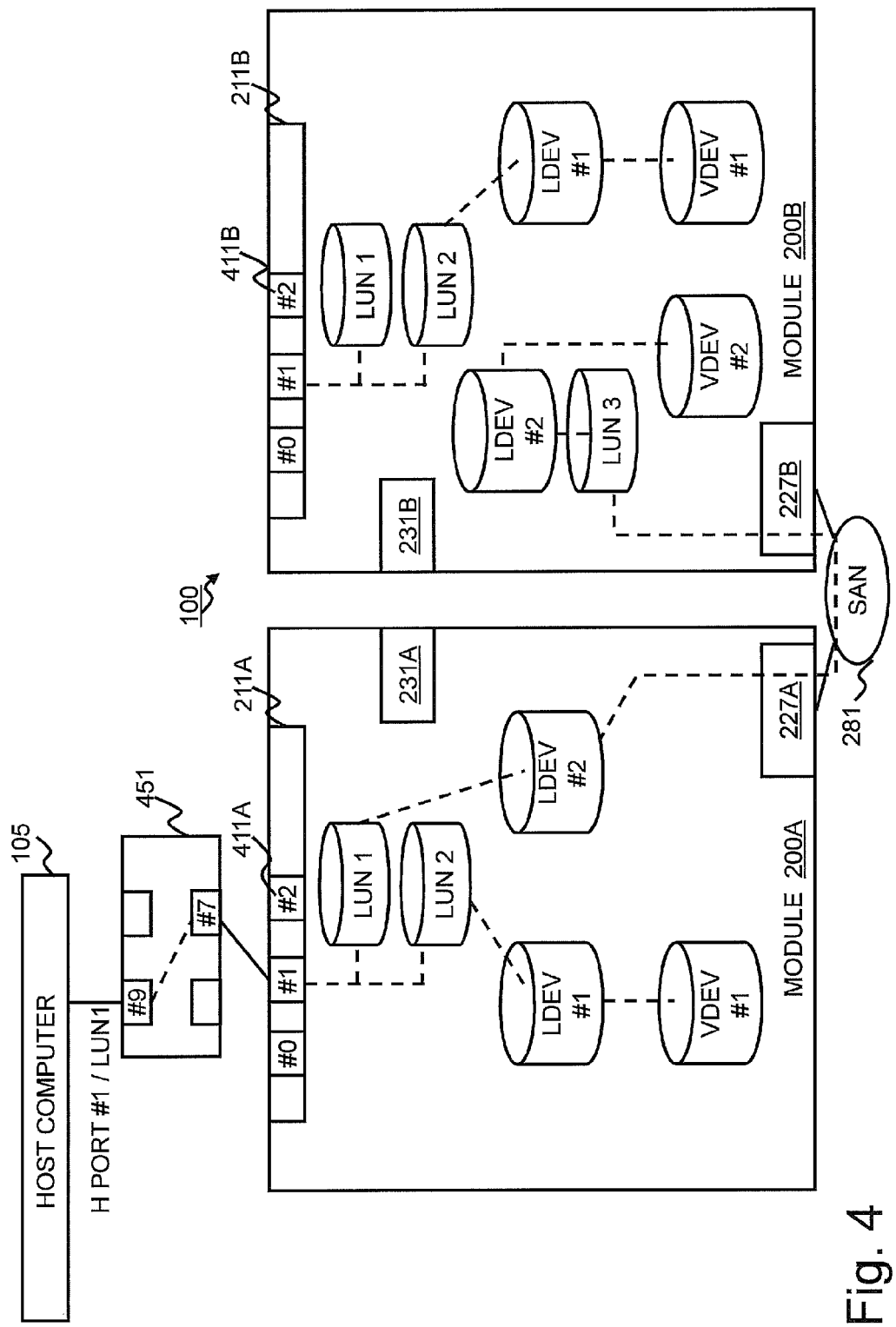
FIG. 4 shows the hierarchy in the loosely-coupled storage system 100.
Figure 5:
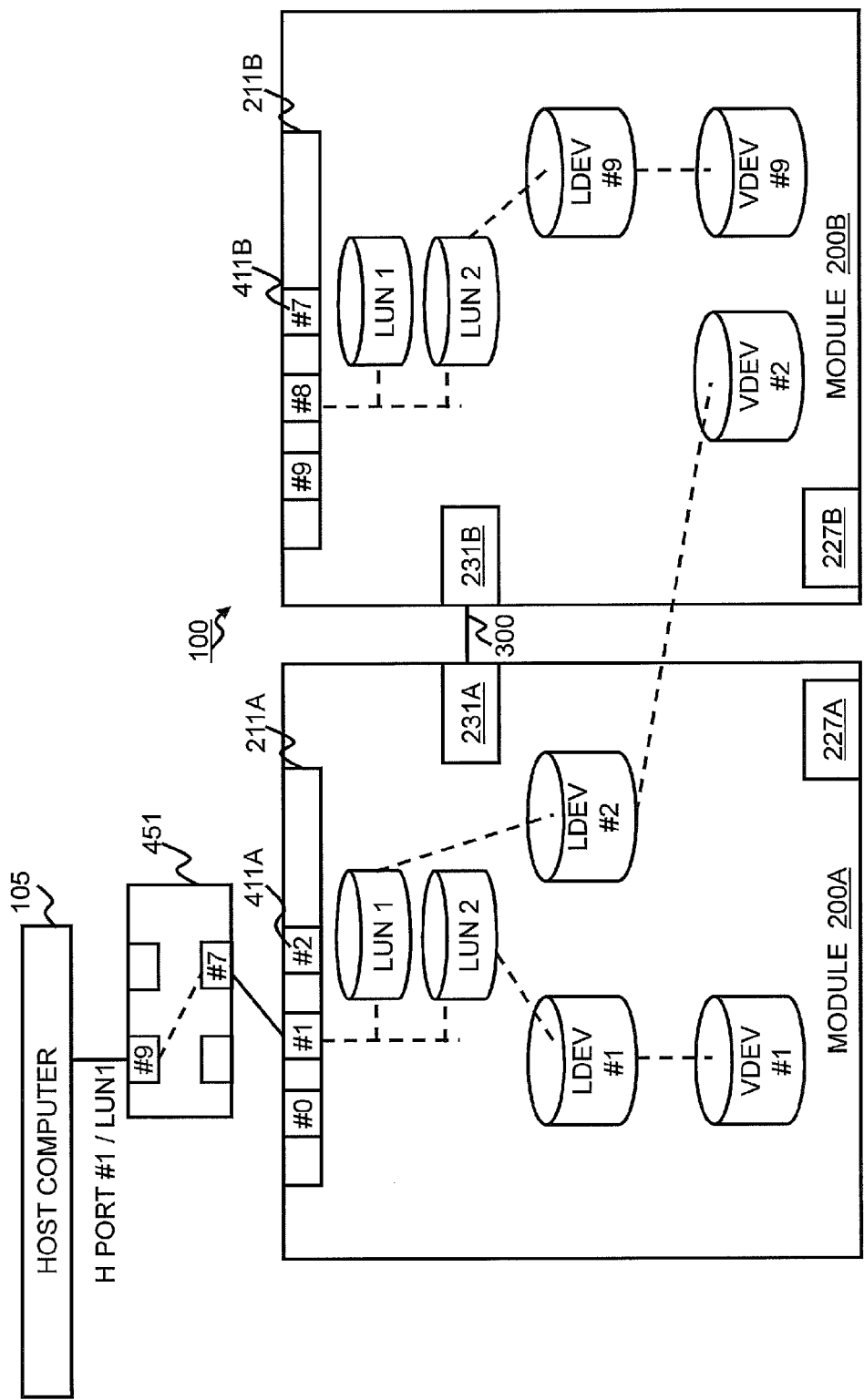
FIG. 5 shows the hierarchy in the tightly-coupled storage system 100.

FIG. 4 shows the hierarchy in a loosely coupled storage system 100. FIG. 5 shows the hierarchy in a tightly coupled storage system 100.

As described above, in the module 200A (200B), one or more RAID group storage spaces is treated as a plurality of virtual storage devices (VDEV), and either one or a plurality of logical storage devices (LDEV) are formed on the basis of the VDEV.

The H-I/F 211A (211B) comprises either one or a plurality of ports 411A (411B).

In the module 200A (200B), the S port #, the LUN, the LDEV # and the VDEV # are managed.

The S port # is the number allocated to the port 411A (411B), and is recognized by the storage system. There is a H port # with respect to the S port #. The H port # is the port # recognized by the host computer 105.

LUN is the abbreviation for Logical Unit Number, and is the number allocated to a LU (Logical Unit). Either one or a plurality of LUN are associated with one S port # (port 411A (411B)).

The LDEV # is the number allocated to a LDEV. Either one or a plurality of LDEV # (LDEV) is associated with a single LUN (LU).

The VDEV # is the number allocated to a VDEV. Either one or a plurality of LDEV # (LDEV) is associated with a single VDEV #.

As types of VDEV, there are an internal VDEV and an external VDEV. Using the module 200A as an example, the internal VDEV and the external VDEV are as follows. That is, the internal VDEV is a VDEV based on the RAID group of the module 200A. The external VDEV is a VDEV based on the RAID group of the module 200B. When an LDEV that is associated with the internal VDEV, an LDEV is also associated with the external VDEV.

According to the loosely coupled storage system 100, as shown in the example of FIG. 4, all of the S port #s, the LUNs, the LDEV #s, and the VDEV #s may be redundant in the modules 200A and 200B (may have identical numbers).

However, in the tightly coupled storage system 100, as shown in the example of FIG. 5, the S port #s, the LDEV #s, and the VDEV #s of the S port #s, the LUNs, the LDEV #s, and the VDEV #s in the modules 200A and 200B may not be redundant. That is, redundancy is not permitted for numbers for which it is not possible to perform an I/O in accordance with an I/O command from the host computer 105 when the numbers are redundant. To avoid number redundancy, the numbers in the module that is not the master from among the module 200A and the module 200B, for example, in the module 200B, are changed when switching from the loose coupling to the tight coupling. According to the examples of FIG. 4 and FIG. 5, in switching from the loose coupling to the tight coupling, the S port #0 through #3, the LDEV #1 and the VDEV #1 in the module 200B are respectively changed to a different number (a number that is not redundant with the number in the module 200A). According to this example, the LUN does not have to be changed. This is because, since the LUN is related to the S port #, even if the LUNs are redundant, it will still be possible to uniquely identify the LU using a combination of the S port # and the LUN provided the S port #s are not redundant.

According to FIG. 4, the VDEV #2 of the module 200B is the external VDEV # with respect to the module 200A, but according to FIG. 5, the VDEV #2 of the module 200B is the internal VDEV # with respect to the module 200A.

<I/O Flow>

In this example, for instance, an I/O is carried out using the following flow of processing.

For example, as shown in FIG. 4, the host computer 105 sends an I/O command (either a write command or a read command) comprising a H port # and a LUN. The switch (for example, the FC (Fibre Channel) Switch) 451 that configures the communication network 107 (refer to FIGS. 1 and 2) comprises routing information (not shown in the drawing) by which the port of this switch 451 from which the I/O command will be outputted is determined in accordance with which H port # was specified when the I/O command was received. The switch 451, for example, sends the I/O command from the #7 port in a case where the received I/O command specified H port #1. This I/O command is received by the #1 port 411A in the module 200A.

In the loosely coupled storage system 100, in a case where the I/O control program 301A identifies the fact that the I/O command received by the #1 port 411A specifies the LUN 1, the I/O control program 301A identifies, based on the management information stored in the SM 225A, the LDEV #2 which is associated with the combination of the S port #1 and the LUN 1. Based on the management information inside the SM 225A, the program 301A identifies the fact that the external VDEV #2 (the VDEV in the module 200B) is associated with the LDEV #2. In accordance with this, the program 301A sends the I/O command to the #2 external VDEV by way of the F-I/F 227A. In this I/O command, for example, the LUN 3, which is associated to the external VDEV #2, is specified. The LUN 3 is one of the LUN that is managed by the module 200B, and, in addition, the LDEV (the LDEV inside the module 200B) that corresponds to the external VDEV #2 is related to the LUN 3. The module 200B receives the I/O command specifying the LUN 3, and the program 301B carries out I/O with respect to the VDEV #2 in response to this I/O command.

Alternatively, in the tightly coupled storage system 100, when the I/O control program 301A identifies the LDEV #2 the same as above, the I/O control program 301A identifies the fact that the internal VDEV #2 (the VDEV #2 in the module 200B) is associated with the LDEV #2. In accordance with this, the program 301A performs I/O with respect to the VDEV #2 by way of the B-I/F 231A.

Even when the S port # of the port 411A changes from #1 to another number in the switch from the loose coupling to the tight coupling, the I/O is carried out with respect to the same VDEV when the H port #1 and the LUN 1 have been specified. This is because, when the H port #1 is specified, the same port 411A, for which the S port # has been changed to a different number, receives the I/O command, and, in addition, the LUN does not change. The LDEV # is related to the LUN and the VDEV # is related to the LDEV #, and although these numbers may change in the switch from the loose coupling to the tight coupling, the corresponding relationships remain the same.

The explanation will be continued below on the supposition that module 200A of the modules 200A and 200B is the master.

<Explanations of the Various Types of Correction Information 311A through 313A>

FIG. 6 shows LDEV # correction information 311A.

The LDEV# correction information 311A is for denoting a value to be added to the LDEV #. Specifically, for example, the information 311A comprises information denoting the following for each module.

(*) Module # (the number allocated to the module 200),
(*) Number of LDEVs (the number of LDEVs of the module 200),
(*) LDEV # correction value (the value to be added to the LDEV #).

Module #0 is the module # of the module 200A, and module #1 is the module 200B. In this example, the module #0 module 200 is the master.

According to the example of FIG. 6, the LDEV # in the module 200A is not corrected. By contrast, the value "48" is added to the LDEV # in the module 200B regardless of whether or not there is a redundant LDEV # in the module 200A. This value of "48" is the number of LDEV that exist in the module 200A. In this example, in the case of a loose coupling, consecutive numbers beginning from 0 are allocated as the LDEV # in both modules 200. For this reason, in the switch from the loose coupling to the tight coupling, adding the number of LDEVs in the module 200A to each LDEV # of the module 200B, which is not the master, makes it possible to prevent redundant LDEV #s in the modules 200A and 200B.

Furthermore, the correction value is not limited to addition, and another process such as subtraction may be performed.

The correction information for avoiding number redundancy is not limited to the LDEV # correction information 311A, but rather, as described above, may be the S port # correction information 312A and the VDEV # correction information 313A, but the respective configurations of the correction information 312A and 313A may substantially be the same as that of the LDEV # correction information 311A (For this reason, the respective configurations of the information 312A and 313A will be omitted from the drawings). For example, the correction information 312A (313A) may comprise a value that is added to the VDEV # (S port #) for each module 200. The value to be added may be a value that denotes the number of VDEVs (ports) of the module 200A.

<Management Information Stored in SM 225A (225B)>

Figure 7:
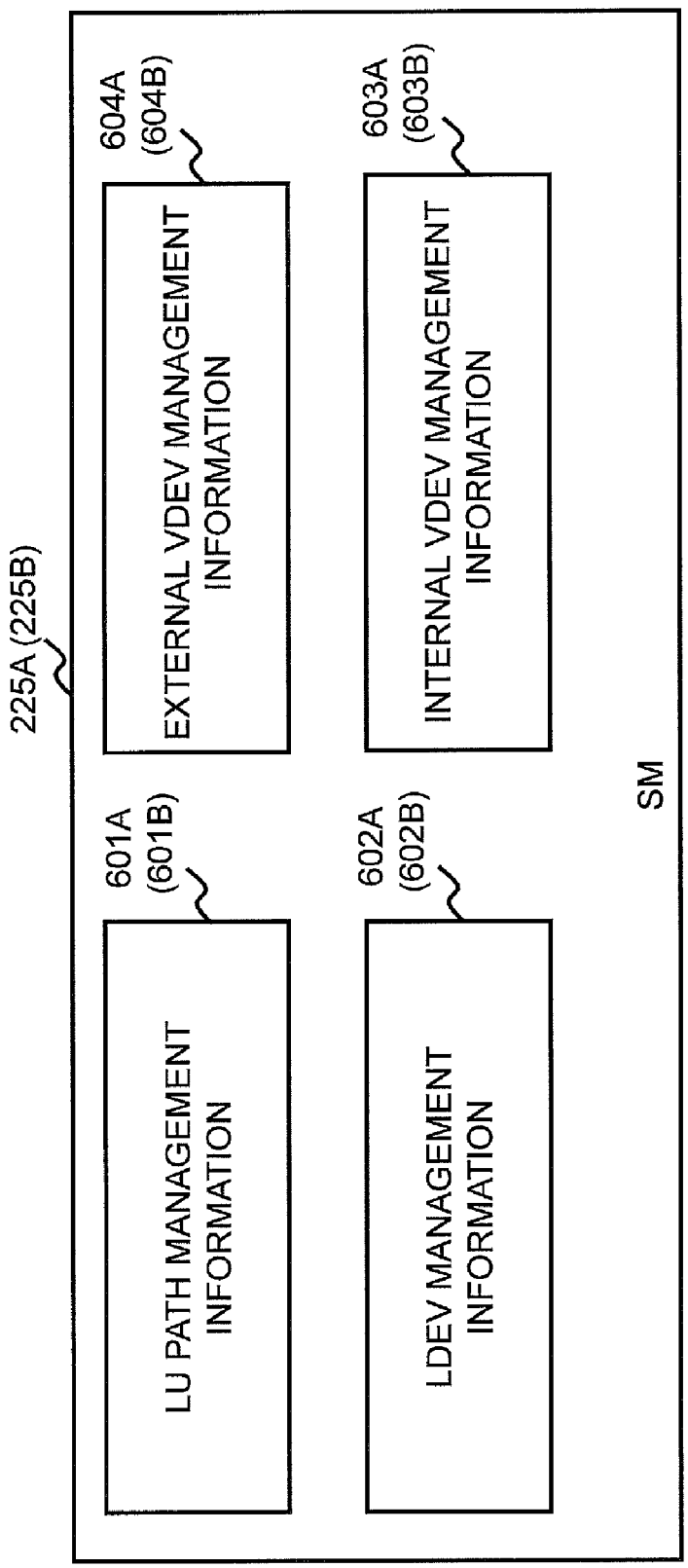
FIG. 7 shows management information stored in SM 225A (225B).

FIG. 7 shows the management information stored in the SM 225A (225B).

The management information includes LU path management information 601A (601B), LDEV management information 602A (602B), internal VDEV management information 603A (603B), and external VDEV management information 604A (604B).

Figure 8:
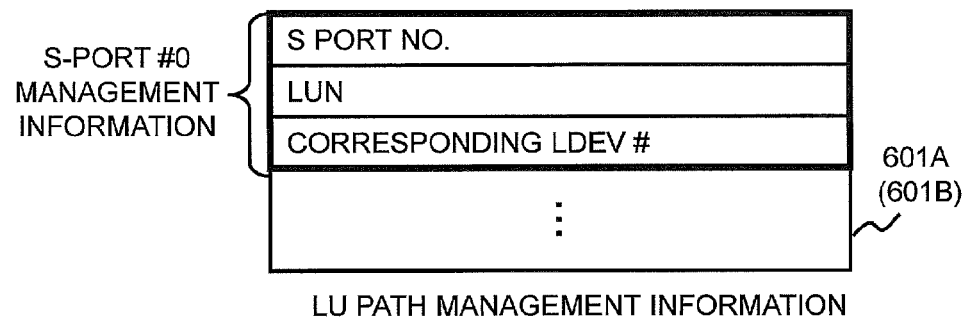
FIG. 8 shows LU path management information 601A (601B).

FIG. 8 shows the LU path management information 601A (601B).

The LU path management information 601A (601B) denotes the relationship of the S port #, the LUN, and the LDEV #. The LU path management information 601A (601B) comprises a S port #, a LUN, and a corresponding LDEV # (a LDEV # related to this LUN) for each set of a S port # and a LUN.

Figure 9:
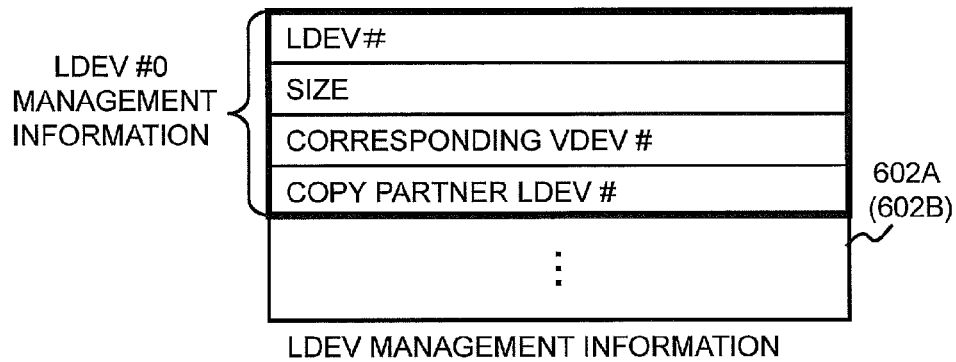
FIG. 9 shows LDEV management information 602A (602B).

FIG. 9 shows the LDEV management information 602A (602B).

The LDEV management information 602A (602B) comprises information related to the LDEV. The LDEV management information 602A (602B), for example, comprises information denoting the following for each LDEV.

(*) LDEV #,
(*) Size (LDEV storage capacity),
(*) Corresponding VDEV # (the VDEV # associated with this LDEV #)
(*) Copy Partner LDEV # (the LDEV # of the LDEV that forms a pair with the LDEV corresponding to this LDEV #).

In this example, information other than the LDEV # and the VDEV # of the LDEV management information 602A (602B) need not be updated with respect to a management information merge process for a switch from the loose coupling to the tight coupling, and a management information partition process for a switch from the tight coupling to the loose coupling. For this reason, even when the coupling configuration has been switched, the information denoting which LDEV forms a pair with which other LDEV is retained without being deleted. In a LDEV pair, either the copy or migration of data is carried out from the one LDEV to the other LDEV. In a case where an LDEV pair has not been formed, an invalid value may be set as the copy partner LDEV #.

Figure 10:
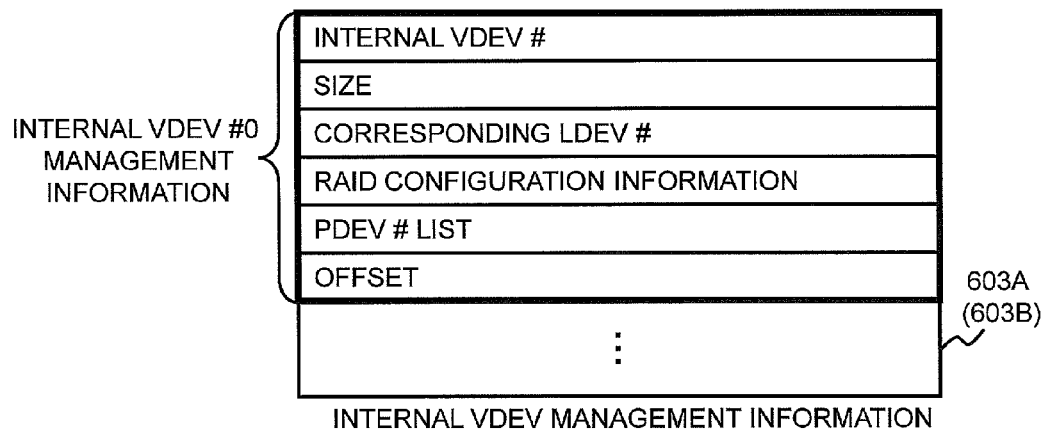
FIG. 10 shows internal VDEV management information 603A (603B).

FIG. 10 shows the internal VDEV management information 603A (603B).

The internal VDEV management information 603A (603B) comprises information related to the internal VDEV. The internal VDEV management information 603A (603B), for example, comprises information denoting the following for each internal VDEV.

(*) Internal VDEV #,
(*) Size (internal VDEV storage capacity),
(*) Corresponding LDEV # (the LDEV # associated with the internal VDEV),
(*) RAID configuration information (information related to the RAID group that forms the basis for the internal VDEV (for example, a RAID level and a combination (information such as 3D+1P) that conforms to the number of physical storage devices configuring the RAID group)),
(*) PDEV # list (a list of numbers of PDEV (physical storage devices) that form the basis for the internal VDEV),
(*) Offset (the difference between the first address of the RAID group storage space and the internal VDEV start address in this storage space).

Figure 11:
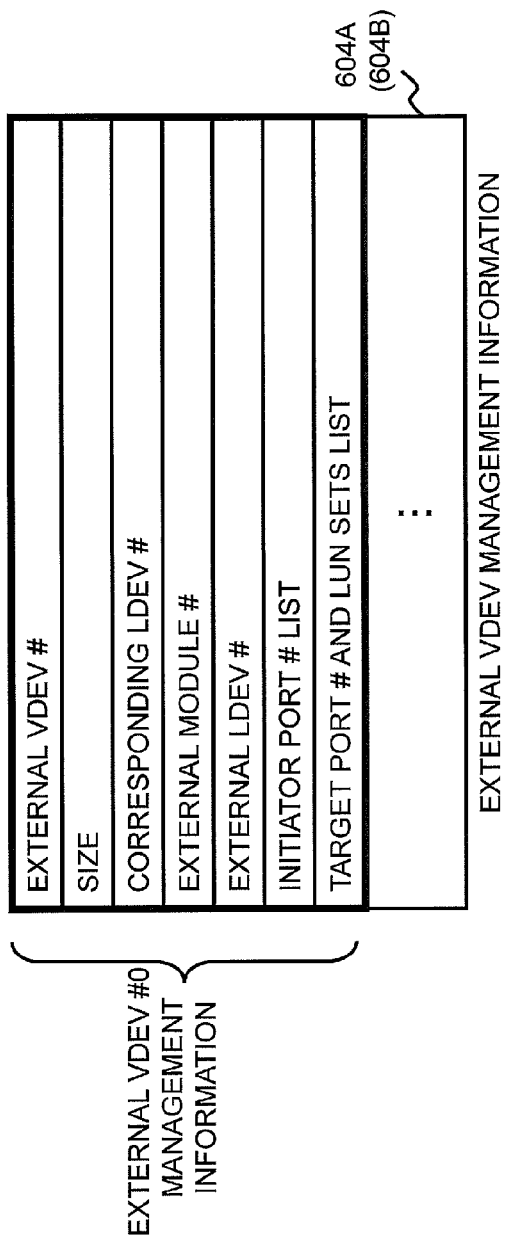
FIG. 11 shows external VDEV management information 604A (604B).

FIG. 11 shows the external VDEV management information 604A (604B).

The external VDEV management information 604A (604B) comprises information related to the external VDEV. The external VDEV with respect to the module 200A is the VDEV inside the module 200B, and the external VDEV with respect to the module 200B is the VDEV inside the module 200A.

The external VDEV management information 604A (604B), for example, comprises information denoting the following for each external VDEV.
(*) External VDEV #,
(*) Size (external VDEV storage capacity),
(*) Corresponding LDEV # (the LDEV # associated to the external VDEV),
(*) External module # (module # of the module (the external module) that comprises the external VDEV),
(*) External VDEV # (LDEV # associated to the external VDEV in the external module),
(*) List of initiator port #s (list of numbers of I/O command source ports sent to an external volume in order to access the external VDEV #),
(*) List of sets of target port #s and LUNs (List of sets of port #s and LUNs able to be specified by an I/O command sent to the external module).

<Setting Module # for Module 200>

Figure 12:
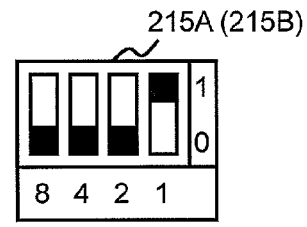
FIG. 12 shows dip switches 215A (215B).

FIG. 12 shows the dip switch 215A (215B).

The dip switch 215A (215B) is a device for specifying the module # to be set in the module 200A (200B). The dip switch 215A (215B) is coupled (electrically coupled) to the configuration LSI 217A (217B). The state of the dip switch 215A (215B) (the number that has been specified using the switch 215A (215B)) is reflected in the below-described module # register of the configuration LSI 217A (217B). The configuration LSI 217A (217B) is able to acquire the module # of the module 200A (200B) that belongs to itself from the value that has been set in its own register.

According to FIG. 12, the dip switch 215A (215B) comprises a sub-switch that can shift up/down for each digit of the module # (binary number representation). The sub-switch is "1" in the shift-up state, and is "0" in the shift-down state. In the example of FIG. 12, "0001" is indicated, and this signifies that the module #1 has been set.

The flow of processing for switching from the loose coupling to the tight coupling and the flow of processing for switching from the tight coupling to the loose coupling will be explained below.

<Switching from Loose Coupling to Tight Coupling>
<<Overview of Processing Flow for Switching from Loose Coupling to Tight Coupling>>

Figure 13:
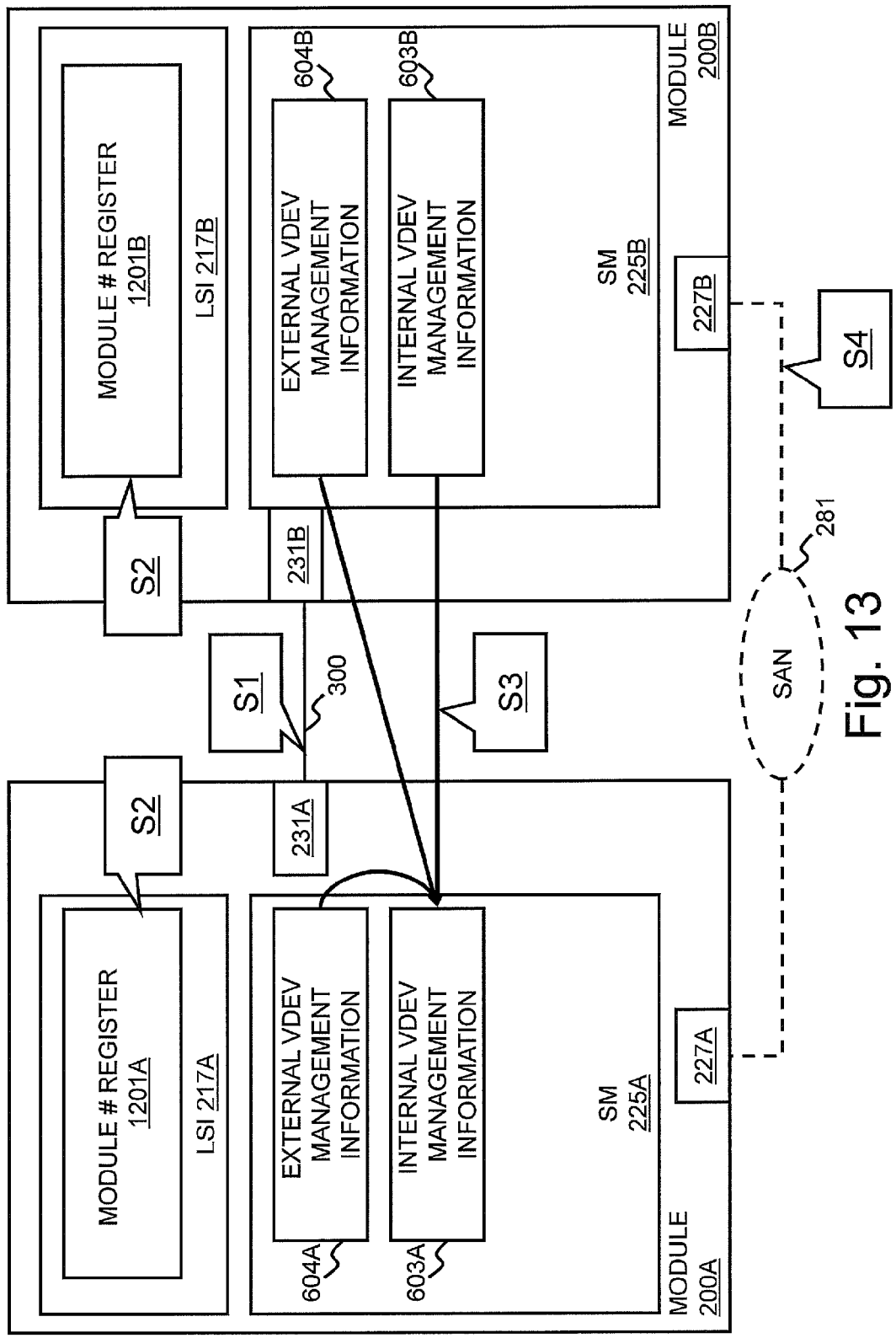
FIG. 13 shows an overview of the processing flow for switching from a loose coupling to a tight coupling.

FIG. 13 shows an overview of the flow of processing for switching from the loose coupling to the tight coupling.

The maintenance staff couples the B-I/Fs 231A and 231B via the back-end path 300 (S1).

Next, the maintenance staff uses the dip switch 215A (215B) to set the module # of each of the modules 200A (200B) (S2). Specifically, the maintenance staff sets module #0 for the module 200A, and sets module #1 for the module 200B. In accordance with this, module #0 is stored in the module # register (the register in which a module # is stored) 1201A of the configuration LSI 217A, and module #1 is stored in the module # register 1201B of the configuration LSI 217B. The fact that the module 200A is the master is recognized by the module #0 being detected in the register 1201A.

Figure 14:
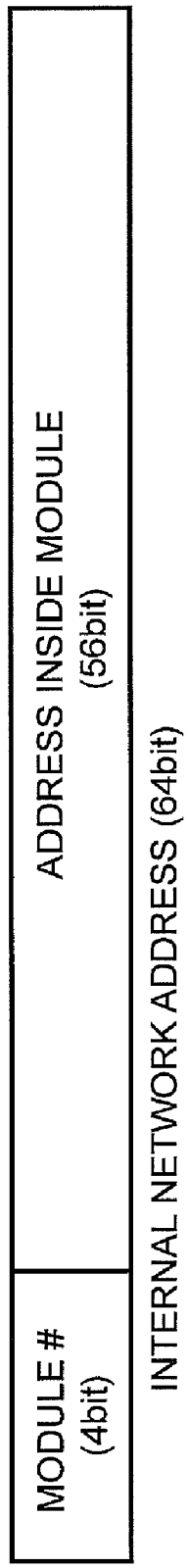
FIG. 14 shows the configuration of an internal network address.

Next, the configuration change program 303A of the master module 200A performs a management information merge process by way of the back-end path 300 (S3). Specifically, for example, the following processes are carried out.
(*) The program 303A merges the information of the external VDEV management information 604A with the internal VDEV management information 603A, and deletes the external VDEV management information 604A. This is because the module 200A manages the VDEV in the module 200B as its internal VDEV in the tight coupling.
(*) The program 303A acquires the information of the management information 604B and 603B from the SM 225B inside the module 200B, and merges this with the internal VDEV management information 603A as well. Furthermore, to access another device (for example, the memory) from the program 303A (the CPU 213A), an internal network address like that shown in FIG. 14 is specified. The internal network address is configured from the module # and the address of the device inside the module. For example, in a case where the program 303A will access the SM 225A, an internal network address comprising the module #0 and the address of the SM 225A is specified. In a case where the program 303A will access the SM 225B, an internal network address comprising the module #1 and the address of the SM 225B is specified. The program 303A is able to access SM 225B by specifying the internal network address that comprises the module #1 and the address of the SM 225B.

Finally, the maintenance staff decouples the F-I/Fs 227A and 227B (S4).

The flow of processing for switching from the loose coupling to the tight coupling will be explained in detail below.

<<Details of Flow of Processing for Switching from Loose Coupling to Tight Coupling>>

Figure 15:
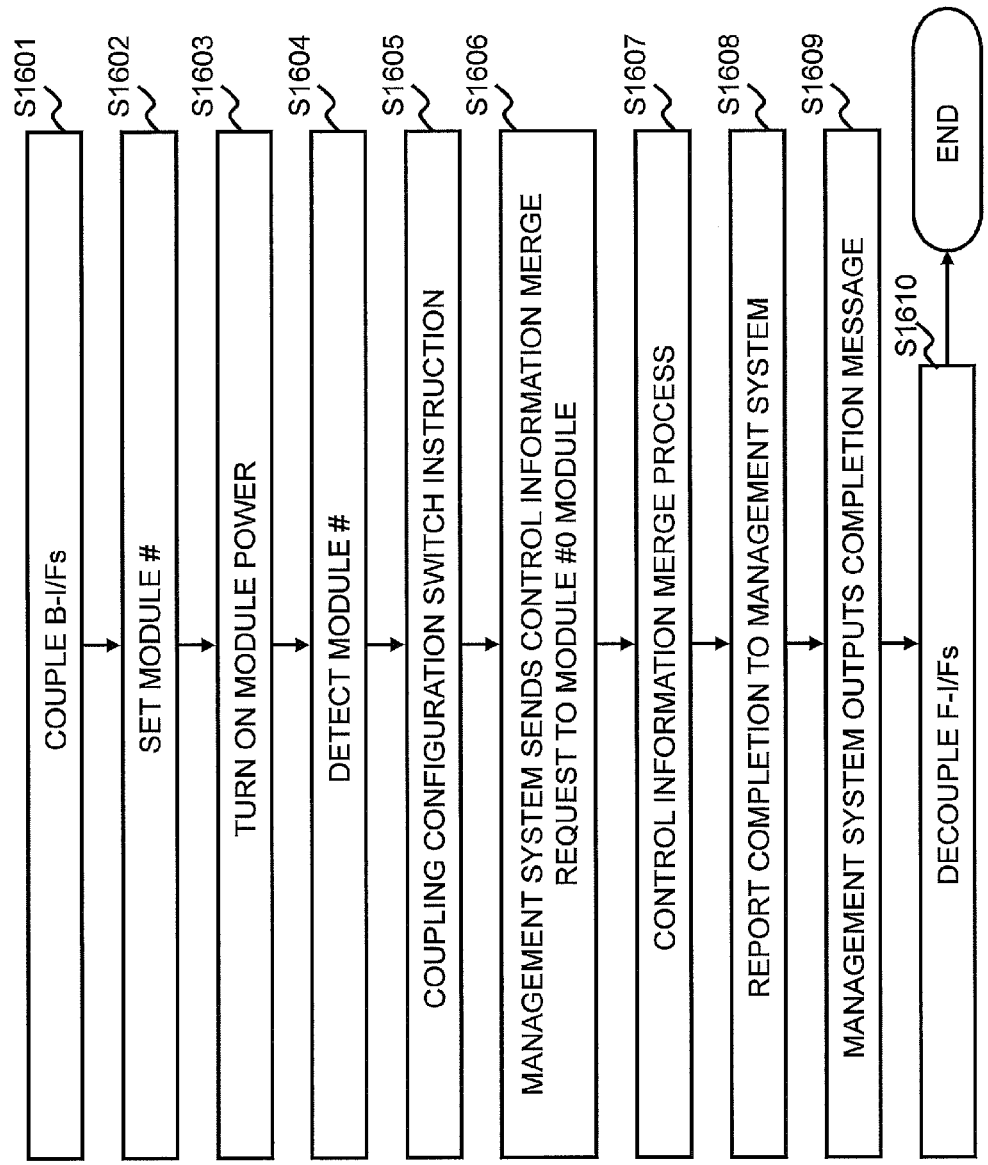
FIG. 15 shows the overall processing flow for switching from the loose coupling to the tight coupling.

FIG. 15 shows the overall flow of processing for switching from the loose coupling to the tight coupling.

The power source for both the modules 200A and 200B is turned OFF prior to the switch from the loose coupling to the tight coupling. The switch from the loose coupling to the tight coupling, for example, is performed during maintenance work.

The maintenance staff couples the B-I/Fs 231A and 231B via the back-end path 300 (S1601).

Next, the maintenance staff sets the module # for each of the modules 200A and 200B (S1602). The module #0 is stored in the register 1201A inside the module 200A, and the module #1 is stored in the register 1201B inside the module 200B at this time.

Next, the maintenance staff turns ON the power to each of the modules 200A and 200B (S1603).

When the power to the module 200A (200B) is turned ON, the configuration LSI 217A (217B) reads the value stored in the register 1201A (1201B) (S1604). In a case where the configuration LSI 217A detects the module #0, the configuration LSI 217A, for example, may set information denoting that the module 200A is the master in the SM 225A.

The maintenance staff instructs the management system 103 to switch the coupling configuration (S1605). At this time, the coupling configuration switch is a switch from the loose coupling to the tight coupling.

The management system 103 sends a management information merge request to the module 200A in response to the instruction of S1605 (S1606). The processing of this request, for example, is carried out by the designated CPU in the module 200A. In other words, the designated CPU executes the configuration change program 303A. The designated CPU is the CPU that was selected using a prescribed rule. A CPU other than the designated CPU may also execute the configuration change program 303A.

The configuration change program 303A carries out the management information merge process in response to the request of S1606 (S1607).

After the management information merge process has ended, the program 303A reports the end of processing to the management system 103 (S1608).

The management system 103 displays a message denoting that processing has ended (S1609). In accordance with this, the maintenance staff is able to learn that the management information merge process has ended.

After learning that the management information merge process has ended, the maintenance staff decouples the F-I/Fs 227A and 227B (S1610). Furthermore, the decoupling of the F-I/Fs 227A and 227B may be carried out during the flow of processing of the switch from the loose coupling to the tight coupling. This is because the switch from the loose coupling to the tight coupling is not communicated via the F-I/Fs 227A and 227B. It is also possible not to carry out the decoupling of the F-I/Fs 227A and 227B.

Figure 16:
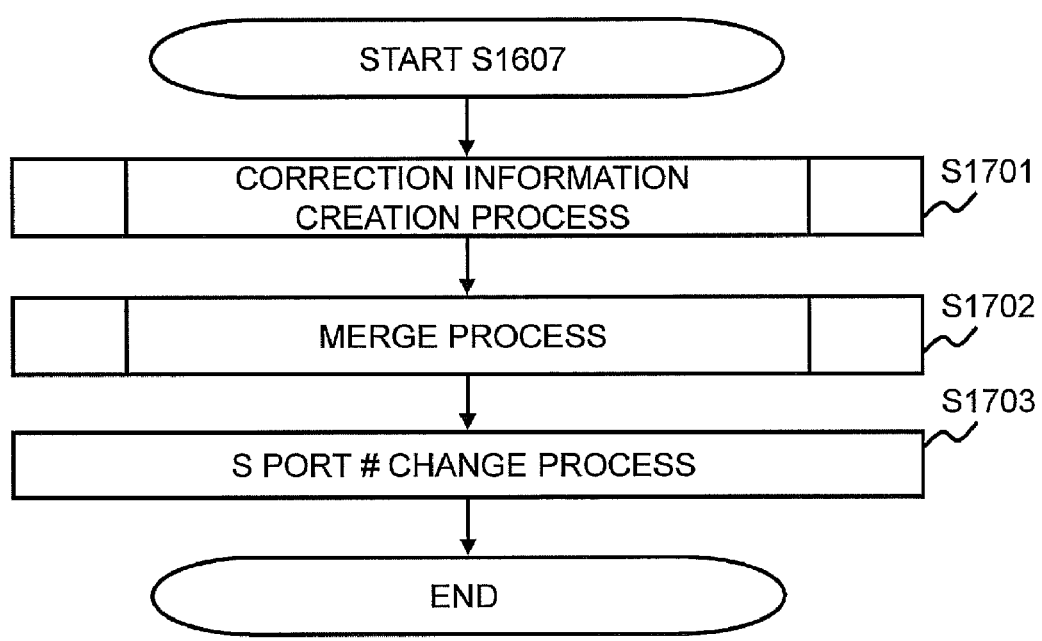
FIG. 16 shows the processing flow of S1607 (a management information merge process) of FIG. 15.

FIG. 16 shows the flow of processing of S1607 (management information merge process) of FIG. 15.

First, the configuration change program 303A performs a correction information correction process (S1701).

Next, the program 303A carries out the merge process (S1702).

Finally, the program 303A carries out the S port # change process (S1703). At this point, the program 303A uses the S port # correction information 313A created in S1701 to correct the S port # in the module 200B. Specifically, for example, the program 303A adds a correction value (a correction value corresponding to the module #1) denoted in the S port # correction information 313A to the S port # in the module 200B.

Figure 17:
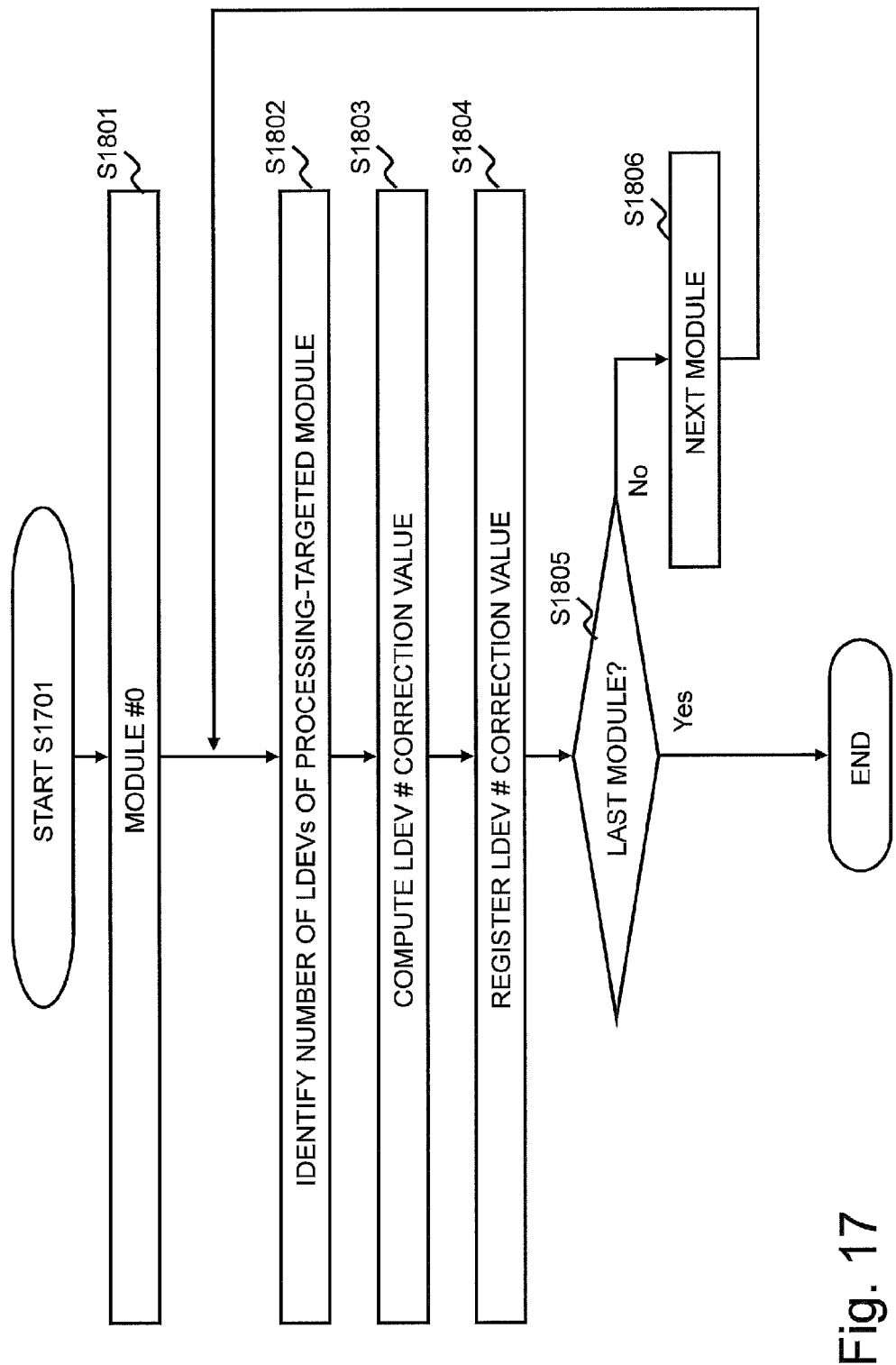
FIG. 17 shows the processing flow (flow of processing for creating the LDEV # correction information) of S1701 (a correction information creation process) of FIG. 16.

FIG. 17 shows the flow of processing of S1701 (correction information creation process) shown in FIG. 16. In particular, FIG. 17 shows the flow of the creation process for the LDEV # correction information. Furthermore, this flow of processing is shared in common with the other correction information 312A and 313A. In the explanation that refers to FIG. 17, the flow of processing for creating the VDEV # correction information 312A and the S port # correction information 313A can be understood by reading "LDEV" as either "VDEV" or "S port".

First of all, the program 303A makes the module #0 module the processing target (S1801).

Next, the program 303A identifies the number of LDEV of the processing-targeted module (the module #0 module), and registers the information denoting the identified number of LDEVs in the LDEV # correction information 311A (S1802). The number of LDEVs of the processing-targeted module is identified from the LDEV management information of the processing-targeted module. In a case where the processing-targeted module is the module 200B, the program 303A identifies the number of LDEVs of the module 200B by referring to the LDEV management information inside the SM 225B.

Next, the program 303A computes the LDEV # correction value (the first LDEV number) of the processing-targeted module (S1803). The LDEV # correction value is the cumulative total of the number of LDEVs registered in the LDEV # correction information 311A. For example, since the module 200A is the first processing target, the LDEV # correction value of the module 200A is "0". The LDEV # correction value of the module 200B is the same value as the number of LDEVs of the module 200A. In a case where another module (for example, a module #2 module) is also tightly coupled to the module 200A, the LDEV # correction value of this other module is the total of the number of LDEVs of the module 200A and the number of LDEVs of the module 200B.

Next, the program 303A determines whether or not the processing target is the last module (S1804). In a case where the processing target is the module 200A, the result of this determination is negative (S1804: NO), the module 200B is regarded as the next processing target (S1806), and S1802 is performed once again.

Figure 18:
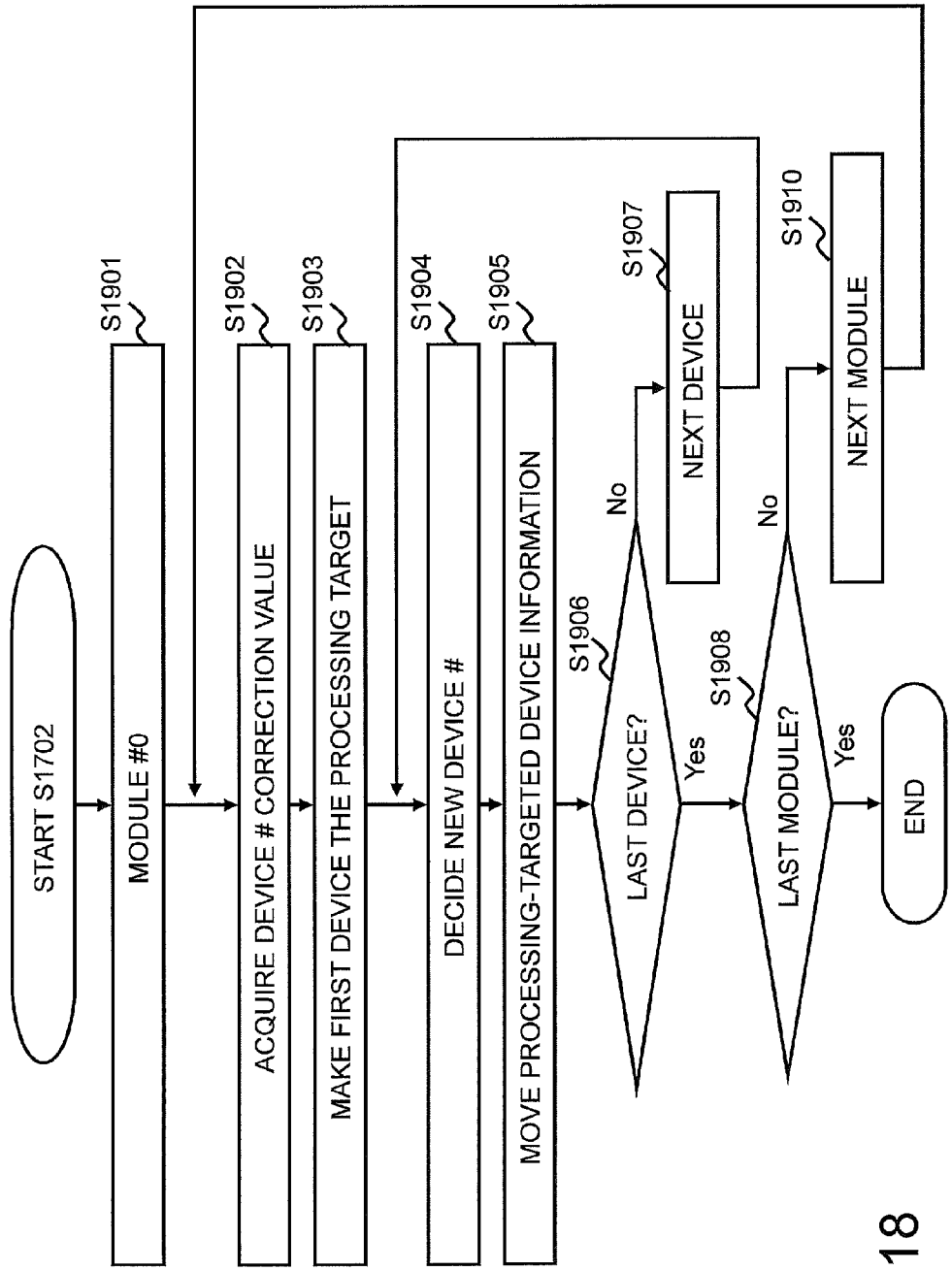
FIG. 18 shows the processing flow of S1702 (a merge process) of FIG. 16.

FIG. 18 shows the flow of processing of S1702 (the merge process) of FIG. 16.

In this merge process, the following three types of merges are carried out:
(Merge Type 1) The merging of the information of the external VDEV management information 604A with the internal VDEV management information 603A;
(Merge Type 2) The merging of the information of the external VDEV management information 604B with the internal VDEV management information 603A; and
(Merge Type 3) The merging of the information of the internal VDEV management information 603B with the internal VDEV management information 603A.

First, the general flow of processing will be explained below, and thereafter, the respective types of merges will be explained.

The program 303A first makes the module #0 module the processing target (S1901).

Next, the program 303A acquires the device correction values (LDEV # correction value, VDEV correction value) corresponding to each module from the correction information 311A (312A) (S1902).

Next, the program 303A makes the first device of the processing-targeted module the processing target (S1903). The first device, for example, may be the device with the smallest device number (LDEV #, VDEV #). The internal VDEV with respect to the module 200A does not become the processing target here.

Next, the program 303A decides on a new device # for the processing-targeted device (S1904). Specifically, the program 303A calculates a new device # by adding the device correction value corresponding to the module comprising the processing-targeted device to the current device # of this processing-targeted device.

Next, the program 303A merges the information related to the processing-targeted device with internal VDEV management information 603.

Next, the program 303A determines whether or not the processing-targeted device is the last device (S1906). In a case where the result of this determination is negative (S1906: NO), the program 303A makes the next device the processing target (S1907) and carries out S1904 once again. On the other hand, in a case where the result of the determination in S1906 is affirmative (S1906: YES), S1908 is carried out.

In S1908, the program 303A determines whether or not the processing-targeted module is the last module. In a case where the result of this determination is negative (S1908: NO), the program 303A makes the next module the processing target (S1907) and carries out S1902 once again.

According to the above-described merge process, the information required from among the external VDEV management information 604A, 604B and the internal VDEV management information 603B is merged with the internal VDEV management information 603A while avoiding device # redundancy.

The above-described merge process in terms of the above-mentioned (Merge Type 1) through (Merge Type 3) is as follows.

<<<Merge Type 1>>>

The processing-targeted module is the module 200A, and the processing-targeted device is the external VDEV (the VDEV # inside the module 200B) with respect to the module 200A.

In this case, in S1904, the program 303A calculates a new VDEV # for the processing-targeted external VDEV by adding the VDEV # correction value corresponding to the module 200B to the current VDEV # of the processing-targeted external VDEV.

In S1905, the information corresponding to the processing-targeted external VDEV (the VDEV treated as the internal VDEV in accordance with the tight coupling) is added to the internal VDEV management information 603A. The various types of information (enclosed in parentheses below) in the information added to the internal VDEV management information 603A, for example, is as follows. The information in the external device management information 604A corresponding to the processing-targeted external VDEV may be deleted.

(*) "Internal VDEV #" is the new VDEV # calculated in S1904.
(*) "Size" is the same as the "size" in the external device management information 604A corresponding to the processing-targeted external device.
(*) "Corresponding LDEV #" is the same as the "corresponding LDEV #" in the external device management information 604A corresponding to the processing-targeted external device.
(*) The "RAID configuration information", the "PDEV # list", and the "offset" are the same as the "RAID configuration information", the "PDEV # list", and the "offset" in the internal VDEV management information 603B corresponding to the above-mentioned new VDEV #.

<<<Merge Type 2>>>

The processing-targeted module is the module 200B, and the processing-targeted device is the external VDEV (the VDV # inside the module 200A) with respect to the module 200B.

In this case, in S1905, the program 303A updates the "corresponding LDEV #" in the internal VDEV management information 603A corresponding to the processing-targeted device to the "corresponding LDEV #" in the external device management information 604B corresponding to the processing-targeted device. In accordance with this, the LDEV inside the module 200B is directly associated with the VDEV inside the module 200A (an association via the B-I/Fs 231A and 231B is realized instead of an association via the F-I/Fs 227A and 227B).

Furthermore, the information in the external device management information 604B corresponding to the processing-targeted device may be deleted.

<<<Merger Type 3>>>

The processing-targeted module is the module 200B, and the processing-targeted device is the internal VDEV with respect to the module 200B.

In this case, in S1904, the program 303A calculates a new VDEV # for the processing-targeted device by adding the VDEV # correction value corresponding to the module 200B to the current VDEV # of the processing-targeted device.

In S1905, the information corresponding to the processing-targeted device (the VDEV treated as the internal VDEV in accordance with the tight coupling) is added to the internal VDEV management information 603A. The various types of information (enclosed in parentheses below) in the information added to the internal VDEV management information 603A, for example, is as follows.

(*) "Internal VDEV #" is the new VDEV # calculated in S1904.
(*) The "size", the "corresponding LDEV #", the "RAID configuration information", the "PDEV # list", and the "offset" are the same as the "size", the "corresponding LDEV #", the "RAID configuration information", the "PDEV # list", and the "offset" in the internal device management information 603B corresponding to the processing-targeted device.

Furthermore, in a case where the LDEV #s in the modules 200A and 200B are redundant in S1905 in at least one of the merge type 1 through the merge type 3, the one LDEV # may be corrected by carrying out the same processing as that of S1904. Then, the pre-correction LDEV # in the management information comprising this pre-correction LDEV # may be changed to the post-correction LDEV #.

<<Example of Timing of Start of Switch from Loose Coupling to Tight Coupling>>

In a loosely coupled storage system 100, the monitoring program 305A inside the master module 200A monitors the utilization rate of communications through the F-I/F 227A, and updates the utilization rate information 314A to the value denoting the detected utilization rate.

The monitoring program 305A performs the following alert determination process either regularly or at the time the utilization rate information 314A is updated.

Figure 19:
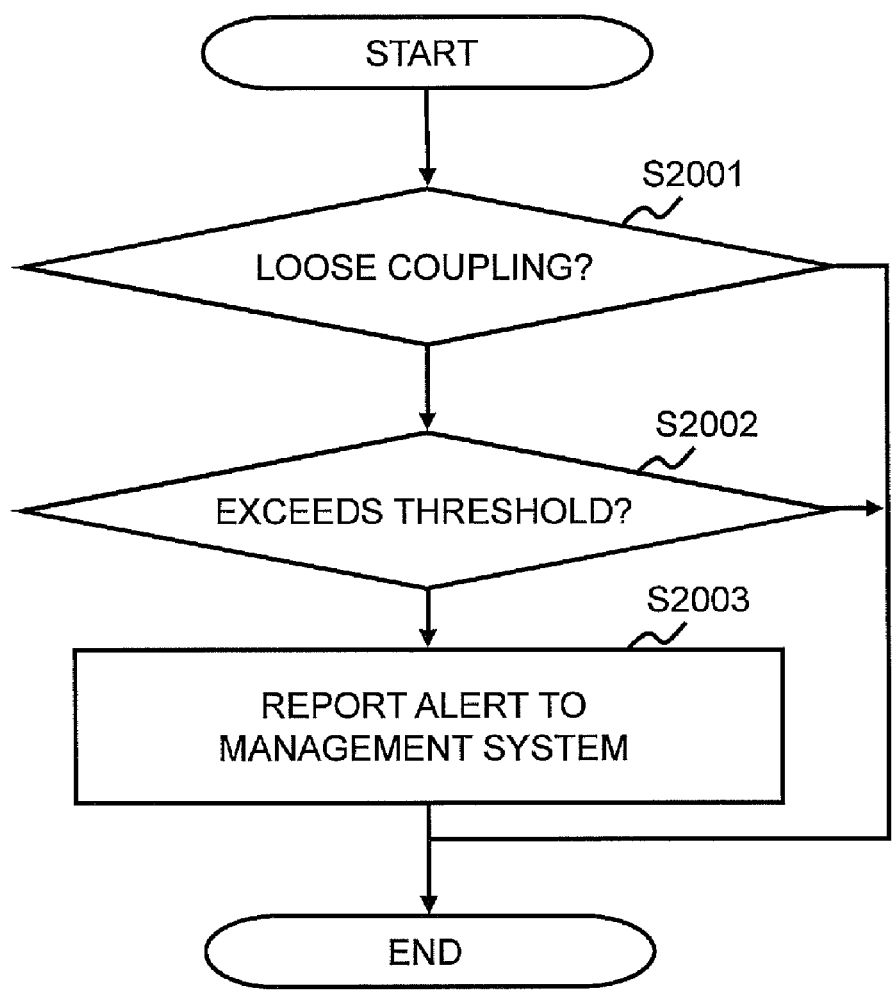
FIG. 19 shows the flow of an alert determination process.

FIG. 19 shows the flow of processing of the alert determination process.

The monitoring program 305A determines whether or not the coupling configuration is the loose coupling (S2001). The determination as to whether or not the coupling configuration is the loose coupling, for example, may be made based on whether communication is possible through the F-I/F 227A or whether communication is possible through the B-I/F 231A, or on the basis of the information (for example, the presence or absence of the external VDEV management information 604A or the value of the flag denoting a loose coupling or a tight coupling) stored in a storage resource, such as either the LM 219A or the SM 225A. In a case where the result of the determination of S2001 is affirmative (S2001: YES), that is, in a case where the coupling configuration is the loose coupling, S2002 is carried out.

In S2002, the monitoring program 305A determines whether or not the value denoted by the utilization rate information 314A exceeds a prescribed threshold.

In a case where the result of the determination of S2002 is affirmative (S2002: YES), the monitoring program 305A reports an alert to the management system 103. This alert, for example, may include a message signifying that a switch from the loose coupling to the tight coupling is recommended because of the high communication load via the F-I/F 227A. The alert is displayed by the management system 103. The maintenance staff is able to learn from this alert that it is desirable to switch the coupling configuration of the storage system from the loose coupling to the tight coupling.

The switch from the loose coupling to the tight coupling may be carried out during maintenance when the power is turned OFF to both the modules 200A and 200B, but either instead of or in addition to this timing, the switch may also be carried out in response to an alert being reported as described above. Furthermore, the utilization rate information 314A may be deleted by the CPU 213A at a prescribed time during the switch from the loose coupling to the tight coupling.

<Switch From Tight Coupling to Loose Coupling>

The switch from the loose coupling to the tight coupling has been explained in detail up to now, but it is also possible to switch from the tight coupling to the loose coupling using a procedure that is substantially the opposite of the switch from the loose coupling to the tight coupling.

Figure 20:
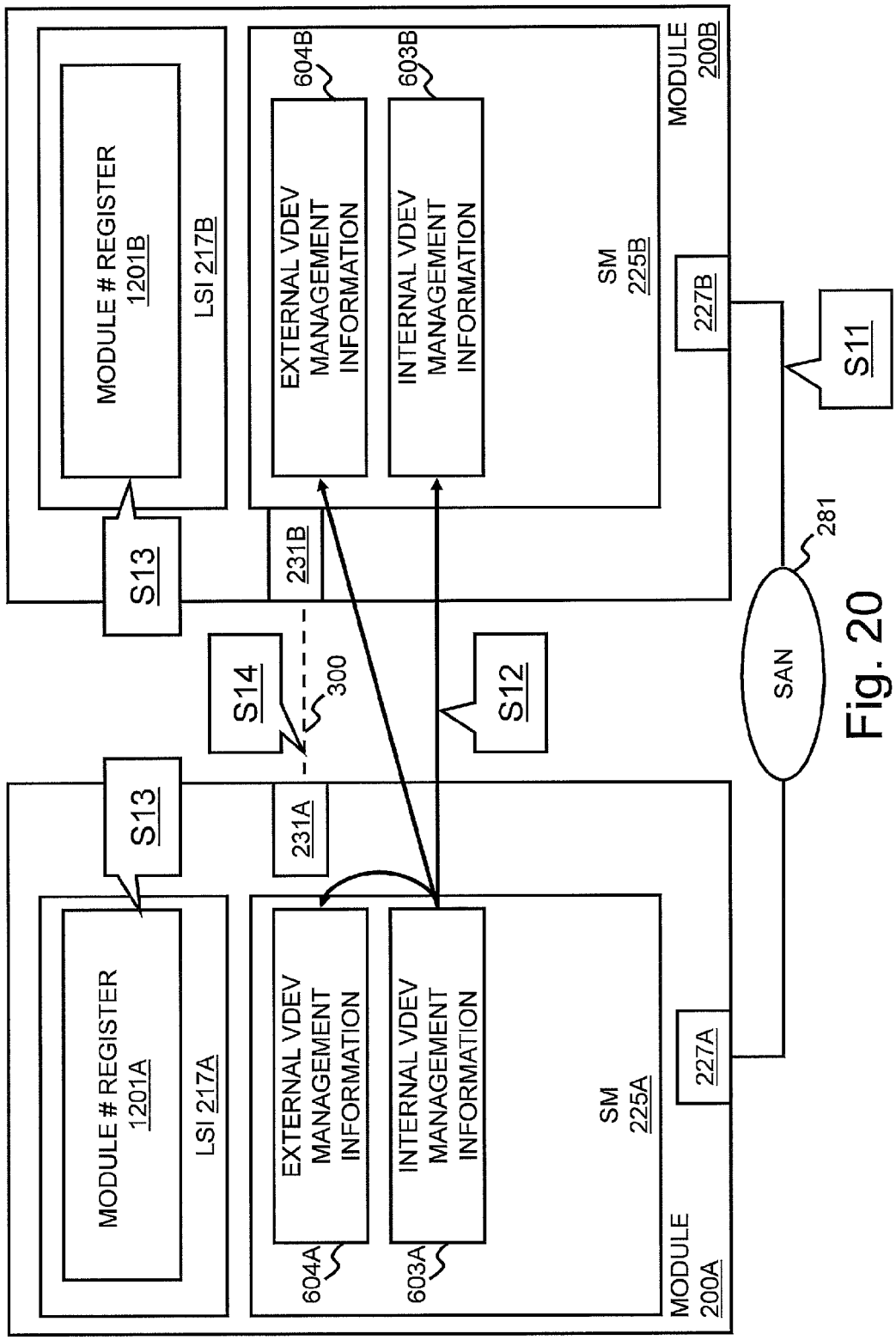
FIG. 20 shows an overview of the processing flow for switching from the tight coupling to the loose coupling.

FIG. 20 shows an overview of the flow of processing for switching from the tight coupling to the loose coupling.

The maintenance staff couples the F-I/Fs 227A and 227B (S11).

Next, the configuration change program 303A in the master module 200A carries out a management information partition process via the back-end path 300 (S12). Specifically, for example, the following processes are performed.

(*) The program 303A migrates the information inside the internal VDEV management information 603A to the internal VDEV management information 603B. This information 603B comprises information related to the VDEV, which is in the module 200B and is associated to the LDEV in the module 200B. Specifically, in this information 603B, the "internal VDEV #", the "size", the "corresponding LDEV #", the "RAID configuration information", the "PDEV # list", and the "offset" may be the same as those in the internal VDEV management information 603A. The "internal VDEV it" in the information 603B may be a value obtained by the VDEV # correction value corresponding to the module 200B being subtracted from the "internal VDEV #" in the information 603A. The "corresponding LDEV #" in the information 603B may be a value obtained by the LDEV # correction value corresponding to the module 200B being subtracted from the "corresponding LDEV #" in the information 603A.

(*) The program 303A adds a new entry to the LDEV management information 602B based on the information inside the LDEV management information 602A. This information 6023 comprises information related to the LDEV, which is in the module 200B and is associated to the VDEV in the module 200B. Specifically, in this information 602B, the "LDEV #" may be the same as that in the information 602A (or may be a value obtained by the VDEV # correction value corresponding to the module 200B being subtracted from the "LDEV #" in the information 602A). The "size" may be the same as that in the information 602A. The "corresponding VDEV#" may be the same as that in the information 602A (or may be a value obtained by the VDEV # correction value corresponding to the module 200B being subtracted from the "corresponding VDEV #" in the information 602A). The "copy mate LDEV#" may be the same as that in the information 602A.

(*) The program 303A adds a new entry to the LU path management information 601B based on the LDEV management information 602A. This information 601B comprises information related to the LDEV, which is in the module 200A and is associated to the VDEV in the module 200B. Specifically, in this information 601B, the "S port number" may a port number of F-I/F227B. "LUN" may be decided using an arbitrary method. The "corresponding VDEV#" may be the same as that in the information 602A (or may be a value obtained by the VDEV # correction value corresponding to the module 200B being subtracted from the "corresponding VDEV #" in the information 602A).

(*) The program 303A migrates the information inside the internal VDEV management information 603A to the external VDEV management information 604A. This information 604A comprises information related to the VDEV which is in the module 200B and is associated to the LDEV in the module 200A. Specifically, in this information 604A, the "external VDEV #" may be the same as the "internal VDEV #" of the internal VDEV management information 603A. The "size" may be the same as the "size" of the information 603A. The "corresponding LDEV#" may be the same as the "corresponding LDEV #" of the information 603A (or, a value obtained by the VDEV # correction value corresponding to the module 200B being subtracted from the "corresponding LDEV #" of the information 603A). The "external module #" may be the module # set in the module 200B. The "external LDEV #", the "initiator port # list", and the "list of sets of target port its and LUNs" may be decided using an arbitrary method.

"List of initiator port #" may be a port # of F-I/F227A. "List of sets of target port # and LUN" may be sets of a port # of F-I/F227B and a value of "LUN" added to the above LU path management information 601B.

(*) The program 303A adds a new entry to the LU path management information 601A based on the LDEV management information 602A. This information 601A comprises information related to the LDEV, which is in the module 200B and is associated to the VDEV in the module 200A. Specifically, in this information 601A, the "S port number" may a port number of F-I/F227A. The "LUN" may be decided using an arbitrary method. The "corresponding VDEV#" may be the same as that in the information 602A (*) The program 303A migrates the information inside the internal VDEV management information 603A to the external VDEV management information 604B by way of the back-end path 300. This information 604B comprises information related to the VDEV in the module 200A, which is the VDEV that is associated to the LDEV in the module 200B. Specifically, in this information 604B, the "external VDEV #" may be the same as the "internal VDEV #" of the internal VDEV management information 603A. The "size" may be the same as the "size" of the information 603A.

The "corresponding LDEV#" may be decided using an arbitrary method. The "external module #" may be the module # set in the module 200A. The "external LDEV #" may be the same as the "corresponding LDEV #" in the information 603A. The "initiator port # list" may be a port # of F-I/F227B. The "list of sets of target port #s and LUNs" may be sets of a port # of F-I/F227A and a value of "LUN" added to the above LU path management information 601A.

(*) The program 303A may subtract the S port # correction value corresponding to the module 200B from the current S port # of the module 200B. The program 303A may subtract the LDEV # correction value corresponding to the module 200B from the current LDEV # to obtain the LDEV # of the module 200B.

Next, the maintenance staff uses the dip switch 215A (215B) to set the module # of each of the modules 200A (200B) (S13). Furthermore, S13 may be performed prior to S12. In this case, the "external module #" in the external VDEV management information 604A (604B) is regarded as the post-setting change module # in the management information partition process.

Finally, the maintenance staff removes the back-end path 300, which couples the B-I/Fs 231A and 231B (S14).

The above-mentioned correction information 311A through 313A does not have to be used in the switch from the tight coupling to the loose coupling. For this reason, the correction information 311A through 313A may be deleted by the CPU 213A subsequent to the management information merge process in the switch from the loose coupling to the tight coupling having ended. The correction information 311A through 313A may be deleted by the CPU 213A subsequent to the management information partition process having ended in a case where this information is used to switch from the tight coupling to the loose coupling.

S14 does not have to be compulsory. However, since one of the advantages of the loose coupling is that the distance between the modules 200A and 200B can be longer than in the case of the tight coupling, it is desirable to carry out S14 in a case where the distance between the modules 200A and 200B should be longer than the maximum distance with the tight coupling.

An example of the present invention has been explained above, but the present invention is not limited to this example, and it goes without saying that a variety of changes are possible without departing from the gist thereof. For example, the module # may be set from the management system 103.

Reference Signs List 200A, 200B . . . Storage module

The invention claimed is:

1. A storage system comprising:
a first storage module that includes a first controller and a first physical storage device; and
a second storage module that includes a second controller and a second physical storage device,
wherein a host computer that sends an I/O command for data I/O is coupled to at least the first storage module of the first and second storage modules,
wherein the first controller includes a first storage resource that stores first management information, which is information that is used to control a data I/O, a first processor that controls the data I/O based on the first management information, a first front-end interface, and a first back-end interface,
wherein the second controller includes a second storage resource that stores second management information, which is information that is used to control a data I/O, a second processor that controls the data I/O based on the second management information, a second front-end interface, and a second back-end interface,
wherein there are a loose coupling and a tight coupling of the first and second storage modules,
wherein the loose coupling is a coupling in which the first and second front-end interfaces are coupled together by way of a front-end path, and the first processor is not able to access the second storage resource,
wherein the tight coupling is a coupling in which the first and second back-end interfaces are coupled together by way of a back-end path, and the first processor is able to access the second storage resource,
wherein the following processing flow is carried out so that coupling of the first and second storage modules is switched from the loose coupling to the tight coupling without the first and second storage modules being partitioned into respectively independent storage modules:
(A) the first and second back-end interfaces are coupled together by way of the back-end path; and
(B) the first processor merges information denoted by the second management information from the second storage resource with the first management information via the back-end path.

2. A storage system according to claim 1,
wherein the first storage module includes a first LDEV, which is a first logical storage device, and a first VDEV, which is a virtual storage device based on a storage space of the first physical storage device,
wherein the second storage module includes a second LDEV, which is a, second logical storage device, and a second VDEV, which is a virtual storage device based on a storage space of the second physical storage device,
wherein the first management information includes first internal VDEV management information and first external VDEV management information,
wherein the first internal VDEV management information includes information, which is related to the first VDEV that is associated with the first LDEV, and which includes identification information for this first VDEV and identification information for the first LDEV associated with this first VDEV,
wherein the first external management information includes information, which is related to the second VDEV that is associated with the first LDEV, and which includes identification information for this second VDEV and identification information for the first LDEV associated with this second VDEV,
wherein the second management information includes second internal VDEV management information, and second external VDEV management information,
wherein the second internal VDEV management information includes information, which is related to the second VDEV that is associated with the second LDEV, and which includes identification information for this second VDEV and identification information for the second LDEV associated with this second VDEV,
wherein the second external management information includes information, which is related to the first VDEV that is associated with the second LDEV, and which includes identification information for this first VDEV and identification information for the second LDEV associated with this first VDEV, and
wherein, in the (B), the first processor:
(b1) merges information of the first external VDEV management information, information of the second external VDEV management information, and information of the second internal VDEV management information with the first internal VDEV management information, corrects the identification information for the second VDEV and the identification information for the second LDEV so that there is no redundancy in the first and second VDEV identification information and in the first and second LDEV identification information, and includes the identification information after correction in the first internal LDEV management information; and
(b2) deletes the first and second external VDEV management information.

3. A storage system according to claim 2,
wherein the first controller includes a first port,
wherein the first management information includes first LU path management information,
wherein the first LU path management information includes identification information for the first port, a first LUN (Logical Unit Number) that is associated with this first port, and the identification information for the first LDEV that is associated with this first LUN,
wherein the second controller includes a second port,
wherein the second management information includes second LU path management information,
wherein the second LU path management information includes identification information for the second port, a second LUN that is associated with this second port, and the identification information for the second LDEV that is associated with this second LUN, and
wherein the following (C) is carried out subsequent to the (B):
(C) the first processor corrects the identification information for the second VDEV and the identification information for the second port so that there is no redundancy in the first and second port identification information.

4. A storage system according to claim 3, wherein the first controller has a first storage area, receives a setting of identification information for the first storage module, and sets this identification information in the first storage area,
wherein the second controller has a second storage area, receives a setting of identification information for the second storage module, and sets this identification information in the second storage area, and
wherein the first processor carries out the processing of the (B) and the (C) in a case where the identification information for the first storage module is specific identification information.

5. A storage system according to claim 4, wherein, in a case where the coupling of the first and second storage modules is the loose coupling, and the first controller receives, from the host computer, an I/O command that specifies a first LUN associated with the first LDEV corresponding to the first VDEV, the first processor identifies the second VDEV corresponding to the first LUN on the basis of the first management information and sends the I/O command for the I/O for the second VDEV by way of the first front-end interface, and
wherein, in a case where the coupling of the first and second, storage modules is the loose coupling, the first processor monitors the load of communication via the front-end interface, and when the load is higher than a prescribed value, outputs an alert to recommend a switch from the loose coupling to the tight coupling.

6. A storage system according to claim 1, wherein the first management information includes first identification information,
wherein the second management information includes second identification information, and
wherein, in the (B), the first processor corrects the second identification information so that there is no redundancy in the first and second identification information, and the second identification information after correction is included in the first management information.

7. A storage system according to claim 1, wherein, in a case where the coupling of the first and second storage modules is the loose coupling, the first processor may communicate with the second controller via the first front-end interface, and
wherein, in a case where the coupling of the first and second storage modules is the loose coupling, the first processor monitors the load of communication via the front-end interface, and when the load is higher than a prescribed value, outputs an alert to recommend a switch from the loose coupling to the tight coupling.

8. A storage system according to claim 1, wherein the front-end path is removed during a switch from the loose coupling to the tight coupling.

9. A storage system according to claim 8, herein the coupling of the first and second storage modules is, switched from the tight coupling to the loose coupling by the following processing without the first and second storage modules being partitioned into respectively independent storage modules:
P) the first and second front-end interfaces are coupled together by way of the front-end path;
Q) the first processor moves a portion of the information of the first management information from the first storage resource to the second storage resource via the back-end path as the second management information; and
(R) the back-end path is removed.

10. A method for switching a coupling of a first storage module and a second storage module,
wherein a host computer that sends an I/O command for data I/O is coupled to at least the first storage module of the first and second storage modules,
wherein the first storage module includes a first storage resource that stores first management information, which is information that is used to control a data I/O,
wherein the second storage module includes a second storage resource that stores second management information, which is information that is used to control a data I/O,
wherein there are a loose coupling and a tight coupling of the first and second storage modules,
wherein the loose coupling is a coupling in which the first and second storage modules are coupled together by way of a front-end path, and the first storage module is not able to access the second storage resource,
wherein the tight coupling is a coupling in which the first and second storage modules are coupled together by way of a back-end path, and the first storage module is able to access the second storage resource, and
the method switches coupling of the first and second storage modules from the loose coupling to the tight coupling using the following processing flow without the first and second storage modules being partitioned into respectively independent storage modules:
(A) the first and second storage modules are coupled together by way of the back-end path; and
(B) the first storage module merges information denoted by the second management information from the second storage resource with the first management information via the back-end path.

11. A storage system comprising:
a first storage module that includes a first controller and a first physical storage device; and
a second storage module that includes a second controller and a second physical storage device,
wherein a host computer that sends an I/O command for data I/O is coupled to at least the first storage module of the first and second storage modules,
wherein the first controller includes a first storage resource that stores first management information, which is information that is used to control a data I/O, a first processor that controls the data I/O on the basis of the first management information, a first front-end interface, and a first back-end interface,
wherein the second controller includes a second storage resource that stores second management information, which is information that is used to control a data I/O, a second processor that controls the data I/O on the basis of the second management information, a second front-end interface, and a second back-end interface,
wherein there are a loose coupling and a tight coupling of the first and second storage modules,
wherein the loose coupling is a coupling in which the first and second front-end interfaces are coupled together by way of a front-end path, and the first processor is not able to access the second storage resource,
wherein the tight coupling is a coupling in which the first and second back-end interfaces are coupled together by way of a back-end path, and the first processor is able to access the second storage resource, wherein coupling of the first and second storage modules is switched from the tight coupling to the loose coupling using the following processing flow without the first and second storage modules being partitioned into respectively independent storage modules:

the first and second front-end interfaces are coupled together by way of the front-end path; and the first processor moves a portion of the information of the first management information from the first storage resource to the second storage resource via the back-end path as the second management information.

12. A method for switching a coupling of a first storage module and a second storage module, wherein a host computer that sends an I/O command for data I/O is coupled to at least the first storage module of the first and second storage modules, wherein the first storage module includes a first storage resource that stores first management information, which is information that is used to control a data I/O, wherein the second storage module includes a second storage resource that stores second management information, which is information that is used to control a data I/O, wherein there are a loose coupling and a tight coupling of the first and second storage modules, wherein the loose coupling is a coupling in which the first and second storage modules are coupled together by way of a front-end path, and the first storage module is not able to access the second storage resource, wherein the tight coupling is a coupling in which the first and second storage modules are coupled together by way of a back-end path, and the first storage module is able to access the second storage resource, and the method switches coupling of the first and second storage modules from the tight coupling to the loose coupling using the following processing flow without the first and second storage modules being partitioned into respectively independent storage modules, the first and second front-end interfaces are coupled together by way of the front-end path, and the first storage module moves a portion of the information of the first management information from the first storage resource to the second storage resource via the back-end path as the second management information.

* * * * *